United States Patent
Nakashima et al.

(10) Patent No.: US 12,192,009 B2
(45) Date of Patent: Jan. 7, 2025

(54) METHOD AND APPARATUS FOR PERFORMING HARQ-ACK TRANSMISSION

(71) Applicant: SHARP KABUSHIKI KAISHA, Sakai (JP)

(72) Inventors: Daiichiro Nakashima, Sakai (JP); Tomoki Yoshimura, Sakai (JP); Hui-Fa Lin, Sakai (JP); Toshizo Nogami, Vancouver, WA (US); Wataru Ouchi, Sakai (JP); Shoichi Suzuki, Sakai (JP); Taewoo Lee, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 536 days.

(21) Appl. No.: 17/442,984

(22) PCT Filed: Feb. 28, 2020

(86) PCT No.: PCT/JP2020/008214
§ 371 (c)(1),
(2) Date: Feb. 14, 2022

(87) PCT Pub. No.: WO2020/195530
PCT Pub. Date: Oct. 1, 2020

(65) Prior Publication Data
US 2022/0173843 A1    Jun. 2, 2022

(30) Foreign Application Priority Data
Mar. 25, 2019 (JP) .................................. 2019-057030

(51) Int. Cl.
*H04L 1/1829* (2023.01)
*H04L 1/1607* (2023.01)
(Continued)

(52) U.S. Cl.
CPC .......... *H04L 1/1854* (2013.01); *H04L 1/1614* (2013.01); *H04L 1/1685* (2013.01);
(Continued)

(58) Field of Classification Search
CPC ... H04L 1/1854; H04L 1/1614; H04L 1/1685; H04L 1/1822; H04L 5/0053; H04L 1/1812
(Continued)

(56) References Cited

U.S. PATENT DOCUMENTS

2019/0045489 A1    2/2019  He et al.
2019/0306923 A1*  10/2019  Xiong ................. H04J 13/0062
(Continued)

FOREIGN PATENT DOCUMENTS

AU    2014201577 A1    4/2014
CN    108293268 A      7/2018
(Continued)

OTHER PUBLICATIONS

Institute for Information Industry (III), Enhancement on HARQ-ACK feedback for URLLC, 3GPP TSG RAN WG1 #96, Athens, Greece, Feb. 25-Mar. 1, 2019, R1-1902742.
(Continued)

*Primary Examiner* — Mark G. Pannell
(74) *Attorney, Agent, or Firm* — ScienBiziP, P.C.

(57) ABSTRACT

A communication method used for a terminal device is provided. The communication method comprises triggering transmission of a first hybrid automatic repeat request acknowledgement (HARQ-ACK) codebook; and when transmission of a second HARQ-ACK codebook is triggered before the first HARQ-ACK codebook has been transmitted, canceling the transmission of the first HARQ-ACK codebook; and transmitting the second HARQ-ACK codebook.

6 Claims, 6 Drawing Sheets

(51) Int. Cl.
  *H04L 1/1822* (2023.01)
  *H04L 5/00* (2006.01)
  *H04L 1/1812* (2023.01)
(52) U.S. Cl.
  CPC .......... *H04L 1/1822* (2013.01); *H04L 5/0053* (2013.01); *H04L 1/1812* (2013.01)
(58) Field of Classification Search
  USPC .......................................................... 370/329
  See application file for complete search history.

(56) References Cited

U.S. PATENT DOCUMENTS

| | | | | |
|---|---|---|---|---|
| 2019/0313386 | A1* | 10/2019 | Hwang | H04W 48/12 |
| 2020/0162207 | A1* | 5/2020 | Hwang | H04L 1/1893 |
| 2020/0213981 | A1* | 7/2020 | Park | H04W 72/23 |
| 2020/0228173 | A1* | 7/2020 | Ye | H04L 5/0055 |
| 2021/0297191 | A1* | 9/2021 | Takeda | H04L 1/1825 |

FOREIGN PATENT DOCUMENTS

| | | |
|---|---|---|
| CN | 109391422 A | 2/2019 |
| WO | 2019027308 A1 | 2/2019 |

OTHER PUBLICATIONS

NTT DOCOMO, New SID Proposal: Study on New Radio Access Technology, 3GPP TSG RAN Meeting #71, Goteborg, Sweden, Mar. 7-10, 2016, RP-160671.

Qualcomm Inc., New WID on NR-based Access to Unlicensed Spectrum, 3GPP TSG RAN Meeting #82, Sorrento, Italy, Dec. 10-13, 2018, RP-182878.

Vivo, "Enhancement for Scheduling/HARQ/CSI processing timeline", R1-1901695, 3GPP TSG RAN WG1 #96, Athens, Greece, Feb. 25-Mar. 1, 2019.

Oppo, "Enhancements on scheduling and HARQ processing timeline", R1-1900284, 3GPP TSG RAN WG1 Ad-Hoc Meeting 1901, Taipei, Jan. 21-25, 2019.

Institute for Information Industry (III), "HARQ-ACK feedback enhancement for URLLC", R1-1811391, 3GPP TSG RAN WG1 Meeting #94bis, Chengdu, P.R. China Oct. 8-12, 2018 (Sep. 28, 2018).

Institute for Information Industry (III), "HARQ enhancement for URLLC", R1-1809125, 3GPP TSG RAN WG1 Meeting #94, Gothenburg, Sweden, Aug. 20-24, 2018 (Aug. 10, 2018).

Huawei, HiSilicon, "DCI design for URLLC", R1-1712213, 3GPP TSG RAN WG1 Meeting #90, Prague, Czech Republic, Aug. 21-25, 2017 (Aug. 12, 2017).

\* cited by examiner

FIG. 2A: Table of number of OFDM symbols per slot $N^{slot}_{symb}$, $\mu^{slot}$ for subcarrier spacing configuration $\mu$ and normal cyclic prefix

| | | slot_configuration | | | |
|---|---|---|---|---|---|
| | | 0 | | 1 | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2B: Table of number of OFDM symbols per slot $N^{slot}_{symb}$, $\mu^{slot}$ for subcarrier spacing configuration $\mu$ and extended cyclic prefix

| | | slot_configuration | | | |
|---|---|---|---|---|---|
| | | 0 | | 1 | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 2 | 12 | 40 | 4 | 6 | 80 | 8 |

METHOD AND APPARATUS FOR PERFORMING HARQ-ACK TRANSMISSION

CROSS-REFERENCE TO RELATED APPLICATION(S)

This application is the National Stage of International Patent Application PCT/JP2020/008214, filed on Feb. 28, 2020, which claims the benefit of and priority to Japanese Patent Application No. 2019-057030, filed on Mar. 25, 2019. The contents of all the aforementioned applications are hereby fully incorporated herein by reference for all purposes.

FIELD

The present disclosure relates to a terminal device and a communication method.

BACKGROUND

In the 3rd Generation Partnership Project (3GPP), the radio access methods and radio networks of cellular mobile communications (hereinafter, referred to as "Long Term Evolution" (LTE) or "Evolved Universal Terrestrial Radio Access" (EUTRA) is being considered. In LTE, a base station device is also called an eNodeB (evolved NodeB), and a terminal device is also called a UE (User Equipment). LTE is a cellular communications system using a plurality of coverage areas of a base station device configured in a cell. A single base station device may also manage a plurality of serving cells.

For 3GPP, in order to propose in the IMT (International Mobile Telecommunication)-2020, which is a standard of the next generation mobile communications system specified by the International Telecommunication Union (ITU), the next generation standard (NR: New Radio) is studied (Non-Patent Literature 1). It is required in a single technology framework that the NR satisfies requirements in the following three assumption scenarios, eMBB (enhanced Mobile Broadband), mMTC (massive Machine Type Communication), and URLLC (Ultra Reliable and Low Latency Communication).

Furthermore, the application of NR in the unlicensed spectrum is studied (Non-Patent Literature 2). The application of NR supporting a wide band (e.g., having a bandwidth of 100 MHz) in carriers in the unlicensed spectrum to realize a data rate of several Gbps is also studied.

PRIOR ART DOCUMENTS

Non-Patent Literature

Non-Patent Literature 1: "New SID proposal: Study on New Radio Access Technology," RP-160671, NTT docomo, 3GPP TSG RAN Meeting #71, Goteborg, Sweden, 7-10 Mar. 2016.

Non-Patent Literature 2: "New WID on NR-based Access to Unlicensed Spectrum," RP-182878, Qualcomm Incorporated, 3GPP TSG RAN Meeting #82, Sorrento, Italy, 10-13 Dec. 2018.

SUMMARY

Problems to be Addressed

For appropriately controlling the data retransmission, data error detection results, data reception results (the received data do not have errors, the received data have errors, the data was not received) from the data receiving side to the data transmitting side is necessary to give appropriate feedback. The data transmitting side retransmits the data that has not been appropriately received by the receiving side based on the information fed back from the data receiving side. For example, the data transmitting side is a base station device, the data receiving side is a terminal device, the data is a transport block (transport block transmitted/received on PDSCH), and the data error detection result and reception result are HARQ-ACK. Efficient communication is achieved by realizing appropriate retransmission control. One aspect of the present disclosure provides a terminal device for efficient communication and a communication method used for the terminal device.

Aspects to Address the Problems (1) A first aspect of the present disclosure is a terminal device comprising a processor and a memory for storing a computer program, wherein, when the processor executes the computer program, causes the terminal device to perform operations including: triggering transmission of a first hybrid automatic repeat request acknowledgement (HARQ-ACK) codebook; and when transmission of a second HARQ-ACK codebook is triggered before the first HARQ-ACK codebook has been transmitted, canceling the transmission of the first HARQ-ACK codebook; and transmitting the second HARQ-ACK codebook.

(2) Furthermore, the first HARQ-ACK codebook defines a relationship between a slot in which the first HARQ-ACK codebook is transmitted/received and a physical downlink shared channel (PDSCH) slot corresponding to a HARQ-ACK among at least one HARQ-ACK included in the first HARQ-ACK codebook; and the second HARQ-ACK codebook defines a HARQ process of a PDSCH corresponding to a HARQ-ACK among at least one HARQ-ACK included in the second HARQ-ACK codebook.

(3) Furthermore, the operations further include: when a first HARQ process set including one or more HARQ processes corresponding to the at least one HARQ-ACK included in the first HARQ-ACK codebook is included in a second HARQ process set including one or more HARQ processes corresponding to the at least one HARQ-ACK included in the second HARQ-ACK codebook, canceling the transmission of the first HARQ-ACK codebook.

(4) Furthermore, the operations further include: when the first HARQ process set is not included in the second HARQ process set, not canceling the transmission of the first HARQ-ACK codebook.

(5) A second aspect of the present disclosure is a communication method used for a terminal device, the communication method including: triggering transmission of a first hybrid automatic repeat request acknowledgement (HARQ-ACK) codebook; and when transmission of a second HARQ-ACK codebook is triggered before the first HARQ-ACK codebook has been transmitted, canceling the transmission of the first HARQ-ACK codebook; and transmitting the second HARQ-ACK codebook.

(6) Furthermore, the first HARQ-ACK codebook defines a relationship between a slot in which the first HARQ-ACK codebook is transmitted/received and a physical downlink shared channel (PDSCH) slot corresponding to a HARQ-ACK among at least one HARQ-ACK included in the first HARQ-ACK codebook; and the second HARQ-ACK codebook defines a HARQ process of a PDSCH corresponding to a HARQ-ACK among at least one HARQ-ACK included in the second HARQ-ACK codebook.

(7) Furthermore, the communication method further includes: when a first HARQ process set including one or more HARQ processes corresponding to the at least one HARQ-ACK included in the first HARQ-ACK codebook is included in a second HARQ process set including one or more HARQ processes corresponding to the at least one HARQ-ACK included in the second HARQ-ACK codebook, canceling the transmission of the first HARQ-ACK codebook.

(8) Furthermore, the communication method further includes: when the first HARQ process set is not included in the second HARQ process set, not canceling the transmission of the first HARQ-ACK codebook.

Effects

According to the present disclosure, the terminal device is able to perform communications efficiently. Furthermore, the base station device is able to perform communications efficiently.

BRIEF DESCRIPTION OF THE DRAWINGS

FIG. 2A illustrates a relationship between $N^{slot}_{symb}$, subcarrier spacing configuration µ, slot configuration and CP configuration according to the present disclosure. FIG. 2B illustrates a relationship between $N^{slot}_{symb}$, subcarrier spacing configuration µ, slot configuration and CP configuration according to the present disclosure.

DESCRIPTION

Hereinafter, the implementations of the present disclosure will be described.

"A and/or B" may be a term including "A," "B," or "A and B."

The parameter or the information indicating one or more values may also be that the parameter or the information includes at least the parameter or information indicating the one or more values. The higher layer parameter may be a single higher layer parameter. The higher layer parameter may be an information element (IE) including a plurality of parameters.

Figure 1:
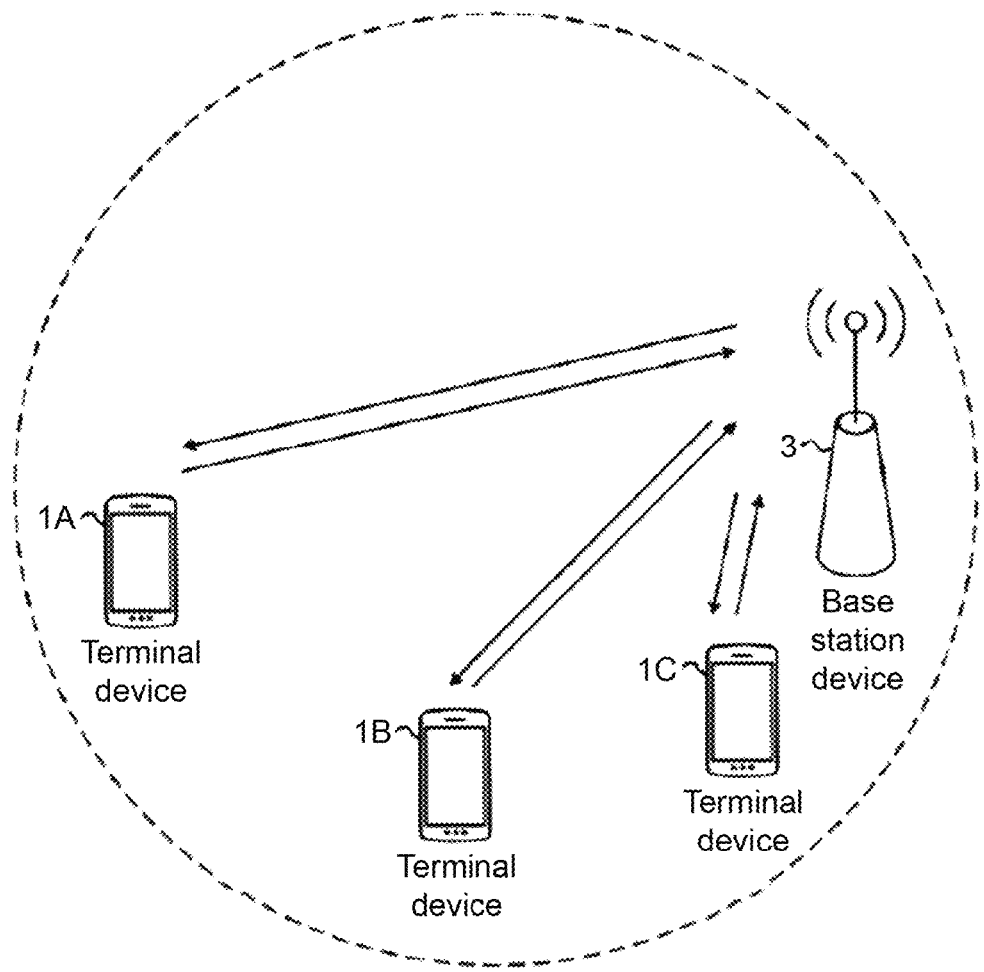
FIG. 1 is a schematic diagram of a radio communications system according to the present disclosure.

FIG. 1 is a schematic diagram of a radio communications system according to the present disclosure. In FIG. 1, the radio communications system includes terminal devices 1A, 1B, 1C and a base station device 3 (gNB). Hereinafter, the terminal devices 1A, 1B, 1C are also referred to as a terminal device 1 (UE).

The base station device 3 may include one or both of an MCG (Master Cell Group) and an SCG (Secondary Cell Group). The MCG is a group of serving cells including at least a PCell (Primary Cell). The SCG is a group of serving cells including at least a PSCell (Primary Secondary Cell).

The PCell may be a serving cell provided based on an initial connection. The MCG may include one or more SCells (Secondary Cells). The SCG may include one or more SCells. The serving cell identity is a short identity for identifying a serving cell. The serving cell identity may be provided by a higher layer parameter.

Hereinafter, the frame configuration will be described.

In the radio communications system according to an aspect of the present disclosure, at least OFDM (Orthogonal Frequency Division Multiplex) is used. An OFDM symbol is a unit of the OFDM time domain. An OFDM symbol includes at least one or more subcarriers. An OFDM symbol may also be converted to a time-continuous signal in generating baseband signal.

The subcarrier spacing (SCS) may be obtained by a subcarrier spacing $\Delta f = 2^\mu \cdot 15$ kHz. For example, the subcarrier spacing configuration µ may be set to any one of 0, 1, 2, 3, 4, and/or 5. The subcarrier spacing configuration µ may also be provided by a higher layer parameter for a certain BWP (BandWidth Part).

In the radio communications system according to an aspect of the present disclosure, a time unit $T_C$ is used to represent the length in the time domain. The time unit $T_C$ may be obtained by $T_C = 1/(\Delta f_{max} \cdot N_f)$. $\Delta f_{max}$ may be the maximum value of the subcarrier spacing supported by the radio communications system according to an aspect of the present disclosure. $\Delta f_{max}$ may be $\Delta f_{max} = 480$ kHz. $N_f$ may be $N_f = 4096$. A constant κ is $\kappa = \Delta f_{max} \cdot N_f/(\Delta f_{ref} N_{f, ref}) = 64$. $\Delta f_{ref}$ may be 15 kHz. $N_{f, ref}$ may be 2048.

The constant κ may be a value indicating the relationship between the reference subcarrier spacing and $T_C$. The constant κ may also be used for subframe length. The number of slots included in a subframe may be obtained based on at least the constant κ. $\Delta f_{ref}$ is a reference subcarrier spacing, and $N_{f, ref}$ is a value corresponding to the reference subcarrier spacing.

The downlink transmission and/or the uplink transmission is composed of 10 ms frame(s). A frame is configured to include 10 subframes. The length of the subframe is 1 µms. The length of the frame may be obtained regardless of the subcarrier spacing $\Delta f$. In other words, the frame configuration may be obtained regardless of µ. The length of the subframe may be obtained regardless of the subcarrier spacing $\Delta f$. In other words, the subframe configuration may be obtained regardless of µ.

The number and index of slots included in a subframe may be obtained for the configuration µ of a certain subcarrier spacing. For example, the first slot number $n^\mu$ may be obtained in ascending order in the range of 0 to $N^{subframe,\mu}_{slot} - 1$ in the subframe. The number and index of the slots included in the frame may be obtained for the subcarrier spacing configuration µ. For example, the second slot number $n^\mu_{s,f}$ may be obtained in ascending order in the range of 0 to $N^{frame,\mu}_{slot} - 1$ in the frame. Consecutive $N^{slot}_{symb}$ OFDM symbols may be included in one slot. $N^{slot}_{symb}$ may be obtained based on at least a part or all of the slot configuration and/or the CP (Cyclic Prefix) configuration. The slot configuration may be obtained by at least a higher layer parameter tdd-UL-DL-ConfigurationCommon. The CP configuration may be obtained based on at least higher layer parameters. The CP configuration may be obtained based on at least a dedicated RRC signaling. The first slot number and the second slot number may also be referred to as a slot number (slot index).

FIG. 2A illustrates a relationship between $N^{slot}_{symb}$, subcarrier spacing configuration µ, slot configuration and CP configuration according to the present disclosure. In FIG.

2A, when the slot configuration is 0, the subcarrier spacing configuration μ is 2, and the CP configuration is a normal CP, $N^{slot}_{symb}=14$, $N^{frame,\mu}_{slot}=40$, $N^{subframe,\mu}_{slot}=4$. FIG. 2B illustrates a relationship between $N^{slot}_{symb}$, subcarrier spacing configuration μ, slot configuration and CP configuration according to the present disclosure. In FIG. 2B, when the slot configuration is 0, the subcarrier spacing configuration μ is 2, and the CP configuration is an extended CP, $N^{slot}_{symb}=12$, $N^{frame,\mu}_{slot}=40$, $N^{subframe,\mu}_{slot}=4$. The $N^{slot}_{symb}$ when the slot configuration is 0 may correspond to double the $N^{slot}_{symb}$ when the slot configuration is 1.

Hereinafter, the physical resources will be described.

An antenna port may be defined such that a channel on which a symbol transmitted at one antenna port can be estimated according to the channel on which other symbols are transmitted at the same antenna port. If a largescale property of a channel on which a symbol is transmitted at one antenna port can be estimated according to the channel on which a symbol is transmitted at another antenna port, the two antenna ports are referred to as QCL (Quasi Co-Located). The largescale property may include at least the long interval property of a channel. The largescale property may also include a part or all of delay spread, Doppler spread, Doppler shift, average gain, average delay, and beam parameters (spatial Rx parameters). For beam parameters, the first antenna port and the second antenna port being QCL may also indicate that the receiving beam assumed by the receiving side corresponding to the first antenna port and the receiving beam assumed by the receiving side corresponding to the second antenna port are the same. For beam parameters, the first antenna port and the second antenna port being QCL may also indicate that the transmission beam assumed by the receiving side corresponding to the first antenna port and the transmission beam assumed by the receiving side corresponding to the second antenna port are the same. The terminal device 1 may assume that the two antenna ports are QCL if the largescale property of the channel on which the symbol is transmitted at one antenna port can be estimated according to the channel on which the symbol is transmitted at another antenna port. The two antenna ports being QCL may also indicate that the two antenna ports are assumed to be QCL.

For the subcarrier spacing configuration and carrier configuration, respectively, the resource grid of $N^{\mu}_{RB,x} N^{RB}_{sc}$ subcarriers and $N^{(\mu)}_{symb} N^{subframe,\mu}_{symb}$ OFDM symbols is obtained. $N^{\mu}_{RB,x}$ may indicate the number of resource blocks obtained for the subcarrier spacing configuration μ of the carrier x. $N^{\mu}_{RB,x}$ may be the maximum number of resource blocks obtained for the subcarrier spacing configuration μ of the carrier x. Carrier x indicates any one of a downlink carrier or an uplink carrier. In other words, x is "DL" or "UL." $N^{\mu}_{RB}$ is a name that includes $N^{\mu}_{RB,DL}$ and/or $N^{\mu}_{RB,UL}$. $N^{RB}_{sc}$ may also indicate the number of subcarriers included in one resource block. At least one resource grid may be obtained for each antenna port p and/or each subcarrier spacing configuration μ and/or for each the transmission direction configuration. The transmission direction includes at least a downlink (DL) and an uplink (UL). Hereinafter, a part or all of a parameter set including at least the antenna port p, the subcarrier spacing configuration μ, and the transmission direction configuration may also be referred to as a first radio parameter set. In other words, one resource grid may be obtained for each first radio parameter set.

In the downlink, a carrier included in a serving cell is referred to as a downlink carrier (or a downlink component carrier). In the uplink, a carrier included in a serving cell is referred to as an uplink carrier (uplink component carrier). The downlink component carrier and the uplink component carrier are collectively referred to as a component carrier (or a carrier).

Each element in the resource grid obtained for each first radio parameter set is referred to as a resource element. The resource element may be determined by a frequency domain index $k_{sc}$ and a time domain index $l_{sym}$. For a certain first radio parameter set, the resource element is determined by a frequency domain index $k_{sc}$ and a time domain index $l_{sym}$. The resource element determined by the frequency domain index $k_{sc}$ and the time domain index $l_{sym}$ is referred to as a resource element ($k_{sc}$, $l_{sym}$). The frequency domain index $k_{sc}$ indicates any value from 0 to $N^{\mu}_{RB} N^{RB}_{sc}-1$. $N^{\mu}_{RB}$ may be the number of resource blocks obtained for the subcarrier spacing configuration μ. $N^{RB}_{sc}$ is the number of subcarriers included in the resource block, and $N^{RB}_{sc}=12$. The frequency domain index $k_{sc}$ may correspond to the subcarrier index $k_{sc}$. The time domain index $l_{sym}$ may correspond to the OFDM symbol index $l_{sym}$.

Figure 3:
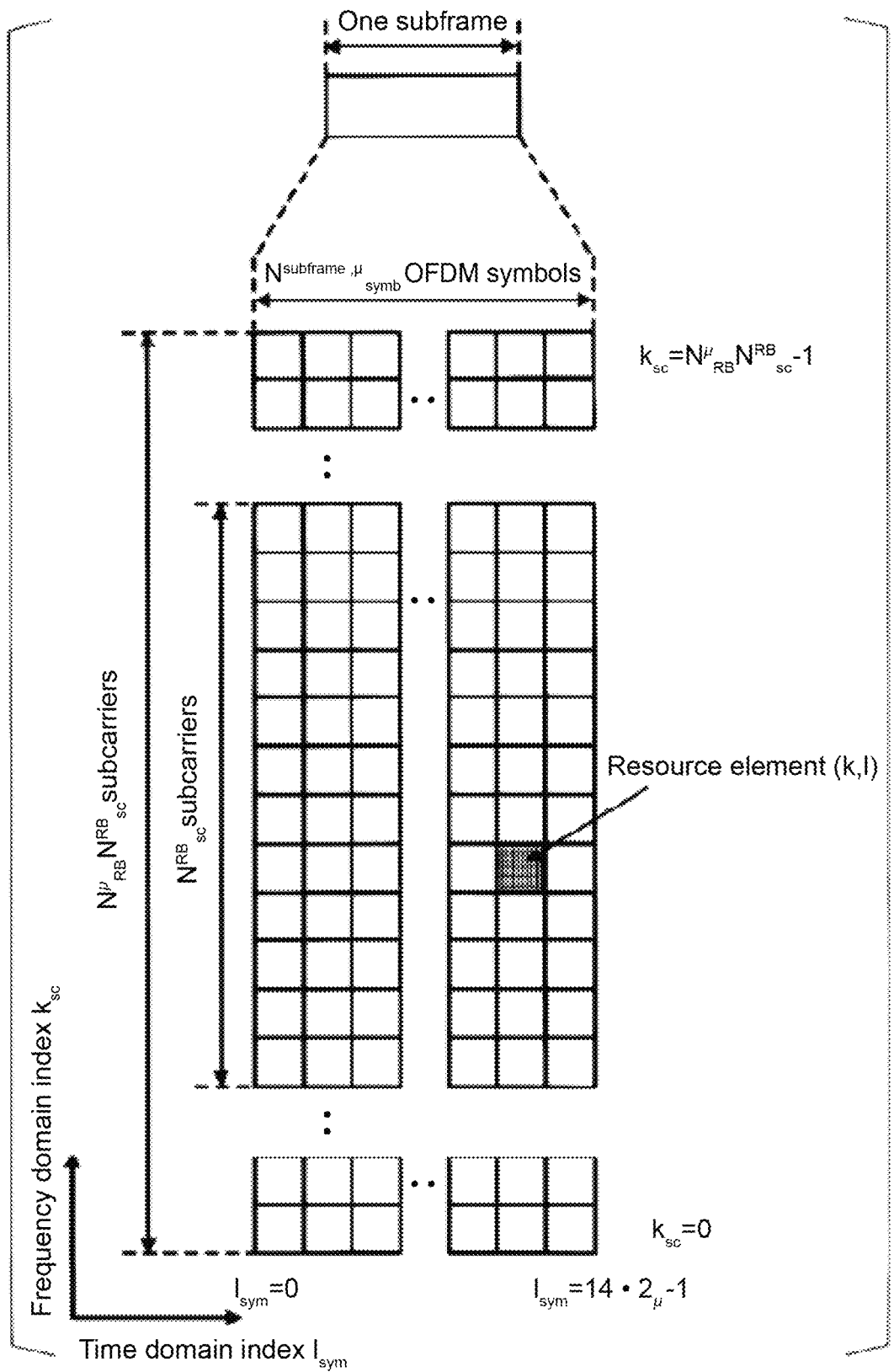
FIG. 3 is a schematic diagram of a resource grid of a subframe according to the present disclosure.

FIG. 3 is a schematic diagram of an example of a resource grid of a subframe according to the present disclosure. In the resource grid of FIG. 3, the horizontal axis is the time domain index $l_{sym}$, and the vertical axis is the frequency domain index $k_{sc}$. In one subframe, the frequency domain resource grid includes $N^{\mu}_{RB} N^{RB}_{sc}$ subcarriers. In one subframe, the time domain resource grid may include $14 \cdot 2^{\mu}$ OFDM symbols. One resource block is composed of $N^{RB}_{sc}$ subcarriers. The time domain resource block may correspond to one OFDM symbol. The time domain resource block may correspond to 14 OFDM symbols. The time domain resource block may correspond to one or more slots. The time domain resource block may correspond to one subframe.

The terminal device 1 may be instructed to perform transmission and receiving using only a subset of the resource grid. A subset of the resource grid may also be referred to as BWP, which may be obtained based on at least a part or all of higher layer parameters and/or the DCI. BWP is also called a bandwidth part (BP). In other words, the terminal device 1 may not be instructed to perform transmission and receiving using all sets of the resource grid. In other words, the terminal device 1 may be instructed to perform transmission and receiving using a part of frequency resources in the resource grid. One BWP may be composed of a plurality of resource blocks in the frequency domain. One BWP may be composed of a plurality of consecutive resource blocks in the frequency domain. BWP configured for a downlink carrier is also referred to as a downlink BWP. BWP configured for an uplink carrier is also referred to as an uplink BWP.

One or more downlink BWPs may be configured for the terminal device 1. The terminal device 1 may attempt to receive a physical channel (for example, PDCCH, PDSCH, SS/PBCH, etc.) in one downlink BWP of one or more downlink BWPs. The one downlink BWP is also referred to as an activated downlink BWP.

One or more uplink BWPs may be configured for the terminal device 1. The terminal device 1 may attempt to transmit a physical channel (for example, PUCCH, PUSCH, PRACH, etc.) in one uplink BWP of one or more uplink BWPs. The one uplink BWP is also referred to as an activated uplink BWP.

A set of downlink BWP may be configured for each of the serving cells. The set of downlink BWPs may include one or more downlink BWPs. A set of uplink BWPs may be set for each of the serving cells. The set of uplink BWPs may include one or more uplink BWPs.

The higher layer parameters are parameters included in a higher layer signal. The higher layer signal may be RRC (Radio Resource Control) signaling or MAC CE (Medium Access Control Control Element). Here, the higher layer signal may be an RRC layer signal or a MAC layer signal.

The higher layer signal may be common RRC signaling. The common RRC signaling may include at least a part or all of the following Features C1 to C3.
  Feature C1) mapped to BCCH logical channel or CCCH logical channel
  Feature C2) including at least radioResourceConfigCommon information element
  Feature C3) mapped to PBCH The radioResourceConfigCommon information element may include indicating information of configuration commonly used in the serving cell. The configuration commonly used in the serving cell may include at least the configuration of the PRACH. The configuration of the PRACH may indicate at least one or more random access preamble indexes. The configuration of the PRACH may indicate at least a time/frequency resource of the PRACH.

The higher layer signal may be a dedicated RRC signaling. The dedicated RRC signaling may include at least a part or all of the following Features D1 to D2.
  Feature D1) mapped to DCCH logical channel
  Feature D2) including at least a radioResourceConfigDedicated information element The radioResourceConfigDedicated information element may include at least information indicating a configuration specific to the terminal device 1. The radioResourceConfigDedicated information element may include at least information indicating a BWP configuration. The configuration of the BWP may indicate at least a frequency resource of the BWP.

For example, the Master Information Block (MIB), the first system information, and the second system information may be included in common RRC signaling. Furthermore, a higher layer message that is mapped to the DCCH logical channel and includes at least the radioResourceConfigCommon may be included in the common RRC signaling. Furthermore, a higher layer message that is mapped to the DCCH logical channel and does not include the radioResourceConfigCommon information element may also be included in the dedicated RRC signaling. Furthermore, a higher layer message that is mapped to the DCCH logical channel and that includes at least the radioResourceConfigDedicated information element may also be included in the dedicated RRC signaling.

The first system information may indicate at least a time index of an SS (Synchronization Signal) block. An SS block is also referred to as an SS/PBCH block. The SS/PBCH block is referred to as SS/PBCH. The first system information may include at least information related to the PRACH resource. The first system information may include at least information related to the configuration of the initial connection. The second system information may be system information other than the first system information.

The radioResourceConfigDedicated information element may include at least information related to the PRACH resource. The radioResourceConfigDedicated information element may include at least information related to the configuration of the initial connection.

Hereinafter, physical channels and physical signals according to various implementations of the present disclosure will be described.

An uplink physical channel may correspond to a set of resource elements that carry information generated in a higher layer. An uplink physical channel is a physical channel used in an uplink carrier. In the radio communications system according to one aspect of the present disclosure, at least some or all of the following uplink physical channels are used.
  Physical uplink control channel (PUCCH)
  Physical uplink shared channel (PUSCH)
  Physical random access channel (PRACH)

The PUCCH may be used for transmitting uplink control information (UCI). The uplink control information includes channel state information (CSI), scheduling request (SR), and part or all of HARQ-ACK (Hybrid Automatic Repeat reQuest ACKnowledgement) corresponding to transport blocks (TB, MAC PDU (Medium Access Control Protocol Data Unit), DL-SCH (Downlink-Shared Channel), and PDSCH (Physical Downlink Shared Channel)).

The HARQ-ACK may include at least a HARQ-ACK bit corresponding to at least one transport block. The HARQ-ACK bit may indicate ACK (acknowledgement) or NACK (negative-acknowledgement) corresponding to one or more transport blocks. HARQ-ACK may include at least a HARQ-ACK codebook including one or more HARQ-ACK bits. The HARQ-ACK bit corresponding to one or more transport blocks may indicate that the HARQ-ACK bit corresponds to a PDSCH including the one or more transport blocks. The HARQ-ACK bit may indicate ACK or NACK corresponding to one CBG (Code Block Group) included in the transport block.

Scheduling Request (SR) may be at least used to request PUSCH resources for initial transmission. The scheduling request bit may be used to indicate either a positive SR or a negative SR. The scheduling request bit indicating a positive SR may also be referred to as "transmitting a positive SR." A positive SR may indicate that the terminal device 1 requests a PUSCH resource for initial transmission. A positive SR may indicate that the scheduling request is triggered by higher layers. A positive SR may be transmitted when the higher layer indicates to transmit a scheduling request. The scheduling request bit indicating a negative SR may also be referred to as "transmitting a negative SR." A negative SR may indicate that the terminal device 1 does not request PUSCH resources for initial transmission. A negative SR may indicate that the scheduling request is not triggered by higher layers. A negative SR may be transmitted when the higher layer does not indicate to transmit a scheduling request.

The channel state information may include at least a part or all of a channel quality indicator (CQI), a precoder matrix indicator (PI), and a rank indicator (RI). The CQI is an index related to channel quality (for example, transmission strength), and the PMI is an index indicating a precoder. The RI is an index indicating the transmission rank (or the number of transmission layers).

The PUCCH supports PUCCH format (PUCCH format 0 to PUCCH format 4). The PUCCH format may be mapped to the PUCCH and transmitted. The PUCCH format may be transmitted with the PUCCH. The transmission of the PUCCH format may also indicate the transmission of the PUCCH.

The PUSCH is at least used for transmitting a transport block (TB, MAC PDU, UL-SCH, PUSCH). The PUSCH may also be used for transmitting at least a part or all of the transport blocks, HARQ-ACK, channel state information, and scheduling requests. The PUSCH is at least used for transmitting the random access message 3.

The PRACH is at least used for transmitting a random access preamble (random access message 1). The PRACH is at least used in a part or all of an initial connection establishment procedure, an over-area handover procedure, a connection re-establishment procedure, synchronization (timing adjustment) for PUSCH transmission, and a resource request for the PUSCH. The random access preamble may be used for notifying the base station device 3 of an index (random access preamble index) obtained from a higher layer of the terminal device 1.

In FIG. 1, the following uplink physical signals are used in the uplink radio communications. The uplink physical signal may not be used for transmitting information output from a higher layer, but is used by the physical layer.

UL DMRS (UpLink Demodulation Reference Signal)
SRS (Sounding Reference Signal)
UL PTRS (UpLink Phase Tracking Reference Signal)

The UL DMRS is related to the transmission of PUSCH and/or PUCCH. The UL DMRS is multiplexed with PUSCH or PUCCH. The base station device 3 may use UL DMRS in order to perform the PUSCH or PUCCH channel correction. Hereinafter, transmitting the PUSCH and the UL DMRS related to the PUSCH together is referred to as transmitting the PUSCH for simplicity. Hereinafter, transmitting the PUCCH and the UL DMRS related to the PUCCH together is referred to as transmitting the PUCCH for simplicity. The UL DMRS related to PUSCH is also referred to as an UL DMRS for PUSCH. The UL DMRS related to PUCCH is also referred to as an UL DMRS for PUCCH.

The SRS may not be related to PUSCH or PUCCH transmission. The base station device 3 may use the SRS for measuring the channel state. The SRS may be transmitted in the last OFDM symbol of a subframe or in the OFDM symbol that is a predetermined number of OFDM symbols from the last.

The UL PTRS may be a reference signal used at least for phase tracking. The UL PTRS may be related to a UL DMRS group that includes at least an antenna port used for one or more UL DMRS. The relationship between the UL PTRS and the UL DMRS group may indicate that at least a part or all of the antenna ports of the UL PTRS and the antenna ports included in the UL DMRS group are QCL. The UL DMRS group may be identified based at least on the antenna port with the smallest index in the UL DMRS included in the UL DMRS group. The UL PTRS may be mapped to the antenna port with the smallest index in one or more antenna ports that one codeword is mapped to. The UL PTRS may be mapped to a first layer when one codeword is at least mapped to the first layer and the second layer. The UL PTRS may not be mapped to the second layer. The index of the antenna port that the UL PTRS is mapped to may be obtained based at least on the downlink control information.

In FIG. 1, the following downlink physical channels are used in the downlink radio communications from the base station device 3 to the terminal device 1. The downlink physical channel is used by the physical layer to transmit information output from a higher layer.

PBCH (Physical Broadcast Channel)
PDCCH (Physical Downlink Control Channel)
PDSCH (Physical Downlink Shared Channel)

The PBCH is used at least for transmitting a master information block (MIB), (BCH: Broadcast Channel). The PBCH may be transmitted based on a predetermined transmission interval. The PBCH may be transmitted with 80 ms intervals. The PBCH may be transmitted with 160 ms intervals. The content of the information included in the PBCH may be updated every 80 ms. A part or all of the information included in the PBCH may also be updated every 160 ms. The PBCH may be composed of 288 subcarriers. The PBCH may be composed of 2, 3, or 4 OFDM symbols included. The MIB may include information related to an identifier (index) of the synchronization signal. The MIB may include at least a part of the information indicating a slot number for transmitting the PBCH, a subframe number, and/or a radio frame number.

The PDCCH is used at least for transmitting of downlink control information (DCI). The PDCCH may be transmitted including at least the downlink control information. The PDCCH may include the downlink control information. The downlink control information may also be referred to as a DCI format. The downlink control information may include at least either a downlink grant or an uplink grant. The DCI format used for PDSCH scheduling is referred to as a downlink DCI format. The DCI format used for PUSCH scheduling is referred to as an uplink DCI format. A downlink grant is also referred to as a downlink assignment or a downlink allocation. The uplink DCI format includes at least one or both of DCI format 0_0 and DCI format 0_1.

The DCI format 0_0 is configured to include at least a part or all of 1A to 1F.

1A) Identifier for DCI formats field
1B) Frequency domain resource assignment field
1C) Time domain resource assignment field
1D) Frequency hopping flag field
1E) MCS field: Modulation and Coding Scheme field
1F) First CSI request field The identifier for DCI formats field may be at least used to indicate to which DCI format of the one or more DCI formats including the identifier for DCI formats field corresponds. The one or more DCI formats may be obtained at least based on a part or all of DCI format 1_0, DCI format 1_1, DCI format 0_0, and/or DCI format 0_1.

The frequency domain resource assignment field may at least be used to indicate the allocation of frequency resources for the PUSCH scheduled by the DCI format that includes the frequency domain resource assignment field. The frequency domain resource assignment field is also referred to as an FDRA (Frequency Domain Resource Allocation) field.

The time domain resource assignment field may at least be used to indicate the allocation of time resources for the PUSCH scheduled by the DCI format that includes the time domain resource assignment field.

The frequency hopping flag field may be at least used to indicate whether frequency hopping is applied to the PUSCH scheduled by the DCI format including the frequency hopping flag field.

The MCS field may be at least used to indicate a part or all of a modulation scheme for PUSCH scheduled by the DCI format containing the MCS field and/or the target code rate. The target code rate may be the target code rate for the PUS CH transport block. The size of the transport block (TBS: Transport Block Size) may be obtained at least based on the target code rate.

The first CSI request field is at least used to indicate CSI reporting. The size of the first CSI request field may be a predetermined value. The size of the first CSI request field may be 0, 1, 2, or 3.

The DCI format 0_1 is configured to include at least a part or all of 2A to 2G.

2A) Identifier for DCI formats field
2B) Frequency domain resource assignment field
2C) Time domain resource assignment field
2D) Frequency hopping flag field
2E) MCS field 2F) Second CSI request field
2G) BWP field The BWP field may be used to indicate the uplink BWP to which the PUSCH scheduled in the DCI format 0_1 is mapped.

The second CSI request field is at least used to indicate CSI reporting. The size of the second CSI request field may be obtained at least based on the higher layer parameter ReportTriggerSize.

The downlink DCI format includes at least one or both of DCI format 1_0 and DCI format 1_1.

The DCI format 1_0 is configured to include at least some or all of 3A to 3H.

3A) Identifier for DCI formats field
3B) Frequency domain resource assignment field
3C) Time domain resource assignment field
3D) Frequency hopping flag field
3E) MCS field: Modulation and Coding Scheme field
3F) First CSI request field
3G) PDSCH to HARQ feedback timing indicator field
3H) PUCCH resource indicator field The PDSCH to HARQ feedback timing indicator field may be a field indicating timing K1. When the index of the slot including the last OFDM symbol of the PDSCH is slot n, the index of the slot including PUCCH or PUSCH may be n+K1. The PUCCH or PUSCH includes at least the HARQ-ACK corresponding to the transport block included in the PDSCH. When the index of the slot including the last OFDM symbol of the PDSCH is slot n, the index of the slot including the starting OFDM symbol of the PUCCH or the starting OFDM symbol of the PUSCH may be n+K1. The starting OFDM symbol of the PUCCH or the starting OFDM symbol of the PUSCH includes at least the HARQ-ACK corresponding to the transport block included in the PDSCH.

Hereinafter, the PDSCH to HARQ feedback timing indicator field may be referred to as a HARQ indicator field.

The PUCCH resource indicator field may be a field indicating the index of one or more PUCCH resources included in the PUCCH resource set.

The DCI format 1_1 is configured to include at least a part or all of 4A to 4J.

4A) Identifier for DCI formats field
4B) Frequency domain resource assignment field
4C) Time domain resource assignment field
4D) Frequency hopping flag field
4E) MCS field: Modulation and Coding Scheme field
4F) First CSI request field
4G) PDSCH to HARQ feedback timing indicator field
4H) PUCCH resource indicator field
4J) BWP field The BWP field may be used to indicate the downlink BWP to which the PDSCH scheduled in DCI format 1_1 is mapped.

The DCI format 2_0 may be configured to include at least one or more slot format indicators (SFI).

The downlink control information may include unlicensed access common information. The unlicensed access common information is control information related to access, transmission/reception of unlicensed spectrum. The unlicensed access common information may be information of a downlink subframe configuration for unlicensed access (slot configuration). The downlink subframe configuration (slot configuration) indicates the position of the OFDM symbol occupied in the subframe (slot) of the PDCCH that is configured to include the downlink subframe configuration (slot configuration) information, and/or the position of the OFDM symbol occupied in the next subframe (slot) of the subframe (slot) of the PDCCH that is configured to include the downlink subframe configuration (slot configuration) information. The downlink physical channel and the downlink physical signal are transmitted and received in the occupied OFDM symbol. The unlicensed access common information may be the information of the uplink subframe configuration (UL duration and offset) (slot configuration). The uplink subframe configuration (slot configuration) information indicates the position of the subframe (slot) of the uplink subframe (uplink slot) started based on the subframe (slot) of the PDCCH that is configured to include the uplink subframe configuration (slot configuration) information, and the number of subframes (slots) of the uplink subframe (uplink slot). The terminal device 1 is not required to receive the downlink physical channel and the downlink physical signal in the subframe (slot) indicated by the uplink subframe configuration (slot configuration) information.

For example, the downlink control information including a downlink grant or an uplink grant is transmitted and received on PDCCH including C-RNTI (Cell-Radio Network Temporary Identifier). For example, the unlicensed access common information is transmitted and received on PDCCH including CC-RNTI (Common Control-Radio Network Temporary Identifier).

In various implementations of the present disclosure, unless otherwise specified, the number of resource blocks indicates the number of resource blocks in the frequency domain.

The downlink grant is used at least for scheduling one PDSCH in one serving cell.

The uplink grant is used at least for scheduling of one PUSCH in one serving cell.

One physical channel may be mapped to one serving cell. One physical channel may be mapped to one BWP configured for one carrier included in one serving cell.

The terminal device 1 may be configured with one or more control resource sets (CORESET). The terminal device 1 monitors the PDCCH in one or more control resource sets. Here, monitoring a PDCCH in one or more control resource sets may include monitoring one or more PDCCH corresponding to each of the one or more control resource sets. Furthermore, the PDCCH may include one or more PDCCH candidates and/or PDCCH candidate sets. Furthermore, monitoring the PDCCH may include monitoring and detecting the PDCCH and/or the DCI format transmitted over the PDCCH.

The control resource set may indicate a time-frequency domain that one or more PDCCH can be mapped to. The control resource set may be an area where the terminal device 1 monitors the PDCCH. The control resource set may be composed of localized resource. The control resource set may also be composed of distributed resource.

In the frequency domain, the unit of mapping of the control resource set may be a resource block. For example, in the frequency domain, the unit of mapping of the control resource set may be six resource blocks. In the time domain, the unit of mapping of the control resource set may be an OFDM symbol. For example, in the time domain, the unit of mapping of the control resource set may be 1 OFDM symbol.

The mapping of the control resource set to the resource blocks may be obtained based at least on the higher layer parameters. The higher layer parameter may include a bitmap for a resource block group (RBG). The resource block group may be obtained with six consecutive resource blocks.

The number of OFDM symbols that compose the control resource set may be obtained based at least on the higher layer parameters.

A certain control resource set may be a common control resource set. The common control resource set may be a control resource set commonly configured for a plurality of terminal devices 1. The common control resource set may be obtained based at least on a part or all of the MIB, the first system information, the second system information, the common RRC signaling, and the cell ID. For example, the time resource and/or the frequency resource of the control resource set configured for monitoring the PDCCH used for scheduling of the first system information may be obtained based at least on the MIB.

The control resource set configured by the MIB is also referred to as CORESET #0. CORESET #0 may be a control resource set with index #0.

A certain control resource set may be a dedicated control resource set. The dedicated control resource set may be a control resource set configured to be used exclusively for the terminal device 1. The dedicated control resource set may be obtained based at least on a part or all of the dedicated RRC signaling and the value of the C-RNTI. A plurality of control resource sets may be configured in the terminal device 1, and an index may be assigned to each control resource set (control resource set index). One or more control channel elements (CCE) may be configured in the control resource set, and an index may be assigned to each CCE (CCE index).

The PDCCH candidate set monitored by the terminal device 1 may be defined in terms of a search space. In other words, the PDCCH candidate set monitored by the terminal device 1 may be obtained by the search space.

The search space may be composed of one or more PDCCH candidates of one or more aggregation levels included. The aggregation level of the PDCCH candidates may indicate the number of CCEs composing the PDCCH. The PDDCH candidates may be mapped to one or more CCEs.

The terminal device 1 may monitor at least one or more search spaces in a slot that the DRX (Discontinuous reception) is not configured. The DRX may be obtained based at least on the higher layer parameters. The terminal device 1 may monitor at least one or more search space sets in slots that DRX is not configured. A plurality of search space sets may be configured in the terminal device 1. An index (search space set index) may be assigned to each search space set.

The search space set may include at least one or more search space. An index (search space index) may be assigned to each search space.

Each of the search space sets may be at least associated with one control resource set. Each of the search space sets may be included in one control resource set. For each of the search space sets, an index of a control resource set associated with the search space set may be obtained.

The search space may include two types, CSS (Common Search Space) and USS (UE-specific Search Space). The CSS may be a search space that is commonly set for a plurality of terminal devices 1. The USS may be a search space that includes setting dedicated for the individual terminal device 1. The CSS may be obtained at least based on the synchronization signal, MIB, first system information, second system information, common RRC signaling, dedicated RRC signaling, cell ID, and the like. The USS may be obtained at least based on the dedicated RRC signaling and/or C-RNTI values. The CSS may be a search space set as a common resource (control resource element) for a plurality of terminal devices 1. The USS may be a search space set in a resource (control resource element) for each individual terminal device 1.

For the CSS, the Type 0 PDCCH CSS carrying the DCI format scrambled for SI-RNTI used for transmitting system information in the primary cell may be used, and the Type 1 PDCCH CSS carrying the DCI format scrambled for RA-RNTI, TC-RNTI used for initial access may be used. The CSS may use a type of PDCCH CSS carrying the DCI format scrambled for CC-RNTI used for unlicensed access. The terminal device 1 may monitor PDCCH candidates in the search spaces. The DCI format scrambled by a predetermined RNTI may be a DCI format with an added CRC (Cyclic Redundancy Check) scrambled by a predetermined RNTI.

The information related to the reception of PDCCH may include the information related to the ID indicating the destination of PDCCH. The ID indicating the destination of the PDCCH may be an ID used for scrambling the CRC bit added to the PDCCH. The ID that indicates the destination of the PDCCH may also be referred to as RNTI (Radio Network Temporary Identifier). The information related to the reception of the PDCCH may include the information related to the ID used for scrambling the CRC bit added to the PDCCH. The terminal device 1 may attempt to receive the PDCCH based on at least the information related to the ID included in the PBCH.

The RNTI may include SI-RNTI (System Information-RNTI), P-RNTI (Paging-RNTI), C-RNTI (Common-RNTI), RA-RNTI (Random Access-RNTI), CC-RNTI (Common Control-RNTI), INT-RNTI (Interruption-RNTI). The SI-RNTI is at least used for scheduling PDSCHs transmitted including system information. The P-RNTI is at least used for scheduling PDSCH transmitted including information, such as paging information and/or system information change notifications. The C-RNTI is at least used for scheduling user data for terminal device 1 that is connected to RRC. The temporary C-RNTI is at least used for scheduling random access message 4. The temporary C-RNTI is at least used for scheduling a PDSCH including data mapped to CCCH in a logical channel. The RA-RNTI is at least used for scheduling random access message 2. The CC-RNTI is at least used for transmitting and receiving control information of unlicensed access. The INT-RNTI is at least used for indicating pre-emption in the downlink.

Furthermore, in the PDCCH and/or DCI included in the CSS, it may not include the CIF (Carrier Indicator Field) indicating which serving cell (or which component carrier) that the PDCCH/DCI schedules the PDSCH or PUSCH for.

Furthermore, when carrier aggregation (CA) is set for the terminal device 1 to aggregate a plurality of serving cells and/or a plurality of component carriers for communication (transmission and/or reception), in the PDCCH and/or DCI included in the USS for a predetermined serving cell (a predetermined component carrier), it may include the CIF indicating which serving cell and/or which component carrier that the PDCCH/DCI schedules the PDSCH or PUSCH for.

Furthermore, when communicating with the terminal device 1 using one serving cell and/or one component carrier, in the PDCCH and/or DCI included in the USS, it may not include the CIF indicating which serving cell and/or which component carrier that the PDCCH/DCI schedules the PDSCH or PUSCH for.

The common control resource set may include CSS. The common control resource set may include both CSS and USS. The dedicated control resource set may include USS. The dedicated control resource set may also include CSS.

The physical resource of the search space is configured by a control channel element (CCE). The CCE is composed of a predetermined number of resource element groups (REGs). For example, a CCE may be composed of six REGs. The REG may be composed of one OFDM symbol of one PRB (Physical Resource Block). That is, the REG may be composed of 12 resource elements (REs). The PRB is referred to as an RB (Resource Block) for simplicity.

The PDSCH is used at least for transmitting/receiving a transport block. The PDSCH may be used at least for transmitting/receiving the random access message 2 (random access response). The PDSCH may be used at least for transmitting/receiving system information including parameters used for initial access.

In FIG. 1, the following downlink physical signals are used in the downlink radio communications. The downlink physical signal may not be used for transmitting information output from a higher layer, but is used by the physical layer.

Synchronization signal (SS)
DL DMRS (DownLink DeModulation Reference Signal)
CSI-RS (Channel State Information-Reference Signal)
DL PTRS (DownLink Phase Tracking Reference Signal)

The synchronization signal is used for the terminal device 1 to synchronize in the downlink frequency domain and/or time domain. The synchronization signal includes PSS (Primary Synchronization Signal) and SSS (Secondary Synchronization Signal).

The SS block (SS/PBCH block) is composed of at least a part or all of the PSS, the SSS, and the PBCH.

The DL DMRS is related to the transmission of PBCH, PDCCH and/or PDSCH. The DL DMRS is multiplexed on PBCH, PDCCH, and/or PDSCH. The terminal device 1 may use the PBCH, the PDCCH, or the DL DMRS corresponding to the PDSCH in order to perform channel correction of the PBCH, the PDCCH, or the PDSCH.

The CSI-RS may be a signal used at least for calculating channel state information. The CSI-RS mode assumed by the terminal device may be obtained at least by the higher layer parameters.

The PTRS may be a signal used at least for phase noise compensation. The PTRS mode assumed by the terminal device may be obtained based at least on the higher layer parameters and/or the DCI.

The DL PTRS may be associated with a DL DMRS group, which includes at least an antenna port used for one or more DL DMRS.

The downlink physical channel and the downlink physical signal are also referred to as a downlink signal. The uplink physical channel and the uplink physical signal are also referred to as an uplink signal. The downlink signal and the uplink signal are collectively referred to as a physical signal. The downlink signal and the uplink signal are also collectively referred to as a signal. The downlink physical channel and the uplink physical channel are collectively referred to as a physical channel. The downlink physical signal and the uplink physical signal are collectively referred to as a physical signal.

The BCH (Broadcast CHannel), the UL-SCH (Uplink-Shared CHannel) and the DL-SCH (Downlink-Shared CHannel) are transport channels. A channel used in a medium access control (MAC) layer is referred to as a transport channel. The unit of the transport channel used in the MAC layer is also referred to as a transport block (TB) or MAC PDU. In the MAC layer, HARQ (Hybrid Automatic Repeat reQuest) control is performed for each transport block. The transport block is a unit of data that the MAC layer delivers to the physical layer. In the physical layer, the transport blocks are mapped to the codewords, and modulation processing is performed for each codeword.

The base station device 3 and the terminal device 1 exchange (transmit and receive) higher layer signals in the higher layer. For example, the base station device 3 and the terminal device 1 may transmit and receive the RRC signaling (RRC message: Radio Resource Control message, RRC information: Radio Resource Control information) in a radio resource control (RRC) layer. Furthermore, the base station device 3 and the terminal device 1 may transmit and receive MAC CE (Control Element) in the MAC layer. Here, the RRC signaling and/or the MAC CE are also referred to as the higher layer signaling.

The PUSCH and PDSCH may be at least used for transmitting RRC signaling and/or MAC CE. Here, the RRC signaling transmitted by the PDSCH from the base station device 3 may be a common signaling to a plurality of terminal devices 1 in the serving cell. The signaling common to a plurality of terminal devices 1 in a serving cell is referred to as common RRC signaling. Furthermore, the RRC signaling transmitted by the PDSCH from the base station device 3 may be signaling dedicated to a certain terminal device 1 (also referred to as dedicated signaling or UE specific signaling). The signaling dedicated to the terminal device 1 is also referred to as dedicated RRC signaling. The higher layer parameters specific to the serving cell may be transmitted/received using the common signaling to a plurality of terminal devices 1 in the serving cell, or transmitted/received using the dedicated signaling to a certain terminal device 1. The UE specific higher layer parameters may be transmitted/received to a certain terminal device 1 using the dedicated signaling.

The BCCH (Broadcast Control CHannel), the CCCH (Common Control CHannel), and the DCCH (Dedicated Control CHannel) are logical channels. For example, the BCCH is a higher layer channel used for transmitting/receiving MIB. Furthermore, the CCCH (Common Control CHannel) is a higher layer channel used for transmitting/receiving information common to a plurality of terminal devices 1. Here, the CCCH may be used, for example, for the terminal device 1 that is not connected to the RRC. Furthermore, the DCCH (Dedicated Control CHannel) is a higher layer channel used at least for transmitting/receiving the dedicated control information to the terminal device 1. Here, the DCCH may be used, for example, for the terminal device 1 connected to the RRC.

The BCCH in the logical channel may be mapped to the BCH, DL-SCH, or UL-SCH in the transport channel. The CCCH of a logical channel may be mapped to a DL-SCH or a UL-SCH in a transport channel. The DCCH of the logical channel may be mapped to the DL-SCH or UL-SCH in the transport channel.

The UL-SCH in transport channel may be mapped to the PUSCH in the physical channel. The DL-SCH of the transport channel may be mapped to the PDSCH in the physical channel. The BCH of the transport channel may be mapped to the PBCH in the physical channel.

Hereinafter, an example of a configuration of the terminal device 1 according to one aspect of the present disclosure will be described.

Figure 4:
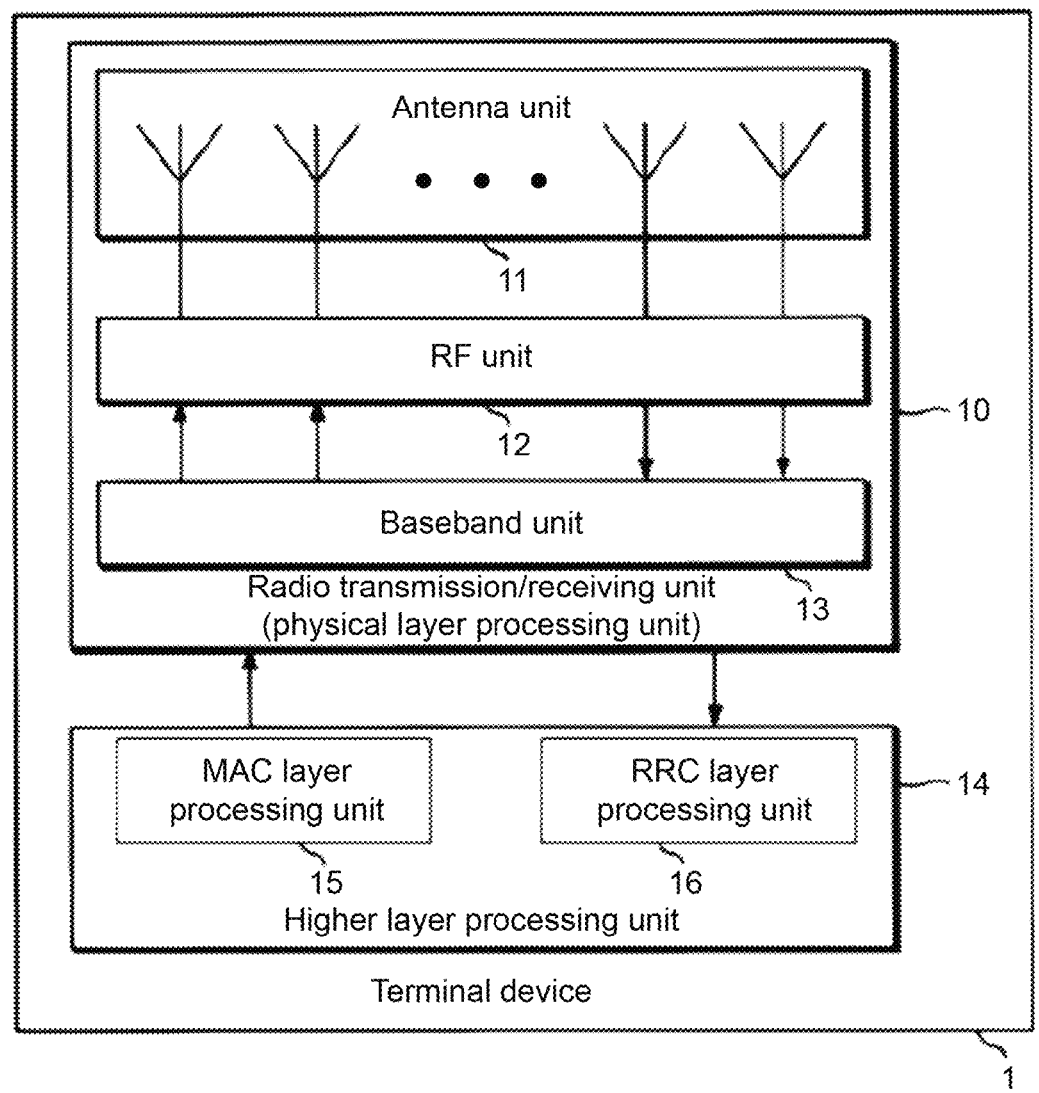
FIG. 4 is a schematic block diagram of a configuration of a terminal device according to the present disclosure.

FIG. 4 is a schematic block diagram of a configuration of a terminal device 1 according to the present disclosure. As illustrated, the terminal device 1 includes a radio transmission/receiving unit 10 and a higher layer processing unit 14. The radio transmission/receiving unit 10 includes at least a part or all of an antenna unit 11, an RF (Radio Frequency) unit 12, and a baseband unit 13. The higher layer processing unit 14 is configured to include: at least a part or all of a medium access control layer processing unit 15 and a radio resource control layer processing unit 16. The radio transmission/receiving unit 10 is also referred to as a transmission unit, a receiving unit, or a physical layer processing unit.

The higher layer processing unit 14 outputs the uplink data (transport block) generated by a user operation or the like to the radio transmission/receiving unit 10. The higher layer processing unit 14 performs processing of a MAC layer, a packet data convergence protocol (PDCP) layer, a radio link control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various configuration information/parameters of the own device. The radio resource control layer processing unit 16 configures various configuration information/parameters based on the higher layer signal received from the base station device 3. In other words, the radio resource control layer processing unit 16 configures various configuration information/parameters based on the information indicating various configuration information/parameters received from the base station device 3. Furthermore, the configuration information may include information related to processing or configuring of a physical channel, a physical signal (i.e., a physical layer), a MAC layer, a PDCP layer, an RLC layer, and an RRC layer. The parameter may also be a higher layer parameter.

The radio transmission/receiving unit 10 performs physical layer processing, such as modulation, demodulation, encoding, and decoding. The radio transmission/receiving unit 10 separates, demodulates, and decodes the received physical signal, and outputs the information to the higher layer processing unit 14. The radio transmission/receiving unit 10 generates a physical signal by modulating data, encoding, and generating a baseband signal (conversion to a time continuous signal), and transmits the physical signal to the base station device 3.

The RF unit 12 converts a signal received via the antenna unit 11 into a baseband signal (down-convert) by quadrature demodulation, and removes undesirable frequency components. The RF unit 12 outputs the processed analog signal to the baseband unit.

The baseband unit 13 converts the analog signal input from the RF unit 12 into a digital signal. The baseband unit 13 removes a portion that corresponds to CP (Cyclic Prefix) from the converted digital signal, performs Fast Fourier Transform (FFT) to the signal that the CP has been removed, and extracts the signal in the frequency domain.

The baseband unit 13 performs an Inverse Fast Fourier Transform (IFFT) on the data, generates an OFDM symbol, appends a CP to the generated OFDM symbol, generates a baseband digital signal, and converts the baseband digital signal into an analog signal. The baseband unit 13 outputs the converted analog signal to the RF unit 12.

The RF unit 12 removes undesirable frequency components from the analog signal input from the baseband unit 13 using a low pass filter, up-converts the analog signal to a carrier frequency, and transmits the analog signal via the antenna unit 11. Furthermore, the RF unit 12 amplifies the power. Furthermore, the RF unit 12 may include a function of controlling the transmission power. The RF unit 12 is also referred to as a transmission power control unit.

Hereinafter, an example of the configuration of the base station device 3 according to one aspect of the present disclosure will be described.

Figure 5:
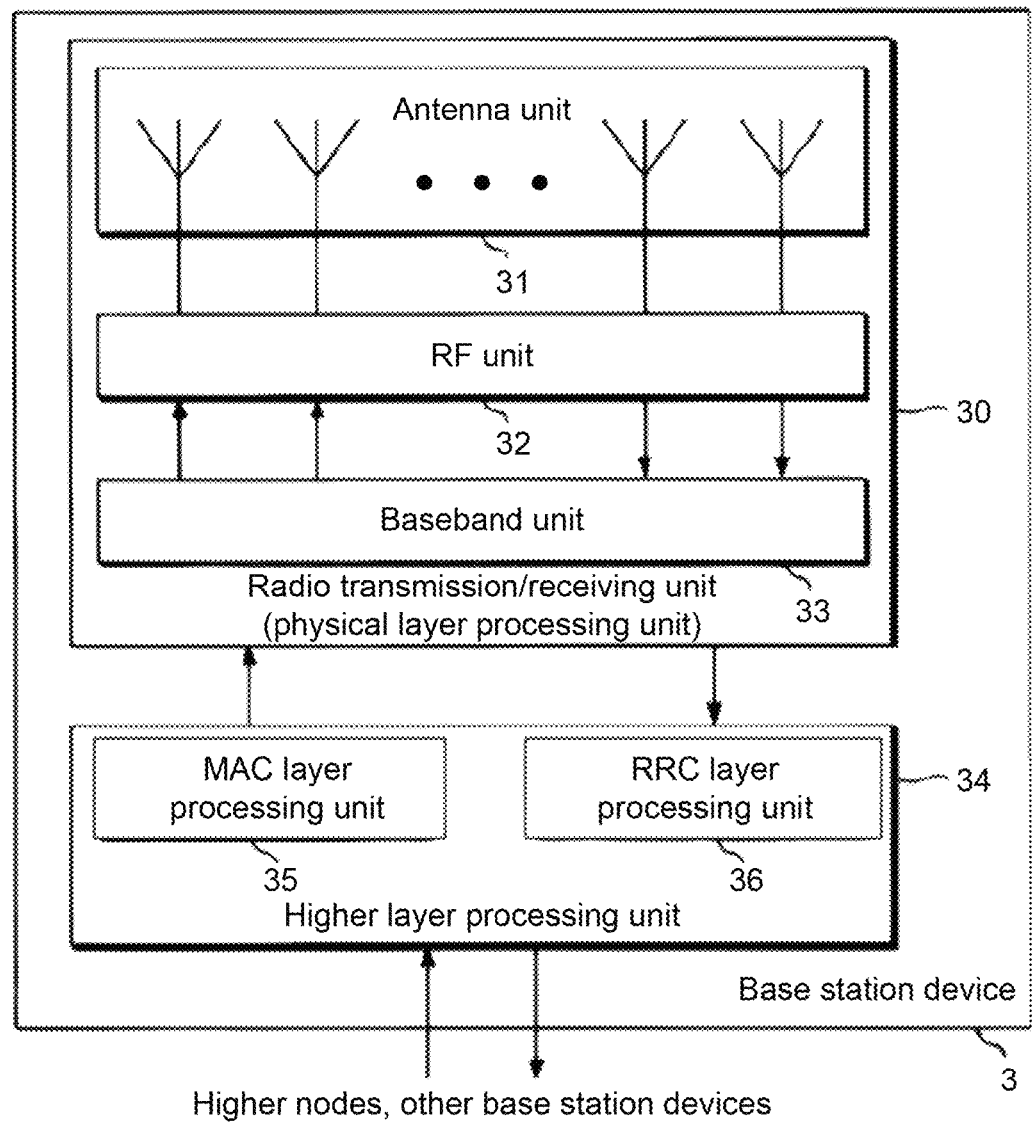
FIG. 5 is a schematic block diagram of a configuration of a base station device according to the present disclosure.

FIG. 5 is a schematic block diagram of a configuration of a base station device 3 according to an aspect of the present disclosure. As illustrated, the base station device 3 is composed of a radio transmission/receiving unit 30 and a higher layer processing unit 34. The radio transmission/receiving unit 30 includes an antenna unit 31, an RF unit 32, and a baseband unit 33. The higher layer processing unit 34 includes a medium access control layer processing unit 35 and a radio resource control layer processing unit 36. The radio transmission/receiving unit 30 is also referred to as a transmission unit, a receiving unit, or a physical layer processing unit.

The higher layer processing unit 34 performs processing of the MAC layer, PDCP layer, RLC layer, and RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates downlink data (transport block), system information, RRC message, MAC CE, and others configured in the PDSCH, or acquires the data from the higher node, and outputs the data to the radio transmission/receiving unit 30. Furthermore, the radio resource control layer processing unit 36 manages various configuration information/parameters of each terminal device 1. The radio resource control layer processing unit 36 may configure various configuration information/parameters for each of the terminal devices 1 via a higher layer signal. In other words, the radio resource control layer processing unit 36 transmits/broadcasts information indicating various configuration information/parameters. The configuration information may include information related to processing or configuring of a physical channel, a physical signal (i.e., a physical layer), a MAC layer, a PDCP layer, an RLC layer, and an RRC layer. The parameter may be a higher layer parameter.

The functions of the radio transmission/receiving unit 30 is the same as those of the radio transmission/receiving unit 10, and will not be repeated here.

Each of the units denoted with reference numerals 10 to 16 included in the terminal device 1 may be composed of a circuit. Each of the units denoted with reference numerals 30 to 36 included in the base station device 3 may be composed of a circuit.

The terminal device 1 may perform carrier sense prior to transmitting the physical signal. Furthermore, the base station device 3 may perform carrier sense prior to transmitting the physical signal. The carrier sense may perform energy detection on a radio channel. Whether or not the physical signal may be transmitted may be given based on the carrier sense performed prior to transmitting the physical signal. For example, when the amount of energy detected by the carrier sense performed prior to transmitting the physical signal is greater than a predetermined threshold, the physical channel may not be transmitted or may be determined to be not transmitted. Furthermore, when the amount of energy detected by the carrier sense performed prior to transmitting the physical signal is smaller than a predetermined threshold value, the physical channel may be transmitted or may be determined to be transmitted. Furthermore, when the amount of energy detected by the carrier sense performed prior to transmitting the physical signal is equal to a predetermined threshold value, the transmission of the physical channel may or may not be performed. That is, when the amount of energy detected by the carrier sense performed prior to transmitting the physical signal is equal to a predetermined threshold value, it may be determined to not be transmitted or to be transmitted.

The procedure of obtaining the transmission of the physical channel based on the carrier sense is also referred to as LBT (Listen Before Talk). As a result of LBT, it is determined that the physical signal cannot be transmitted is also referred to as a busy state or busy. For example, the busy state may be a state in which the amount of energy detected by carrier sense is larger than a predetermined threshold value. Furthermore, as a result of LBT, it is determined that the physical signal can be transmitted is also referred to as an idle state or idle. For example, the idle state may be a state in which the amount of energy detected by carrier sense is smaller than a predetermined threshold value. As a result of LBT, it is determined that the transmission of a physical signal is impossible is also called LBT failure.

The channel occupancy section (Channel Occupancy Time: COT) may be a predetermined value by the country, or may be predetermined for each frequency band. The base station device 3 may notify the terminal device 1 of the channel occupancy section. The terminal device 1 recognizes the length of the channel occupancy section, and can take charge of the timing of the ending of the channel occupancy section. For example, the maximum value of COT may be any one of 2 ms, 3 ms, 6 ms, 8 ms, and 10 ms.

The terminal device 1 may multiplex the uplink control information (UCI) on the PUCCH and transmit it. The terminal device 1 may multiplex the UCI on the PUSCH and transmit it. The UCI may include at least one of downlink channel state information (CSI), scheduling request (SR) indicating a PUSCH resource request, and HARQ-ACK (Hybrid Automatic Repeat reQuest ACKnowledgement) for downlink data (Transport block, Medium Access Control Protocol Data Unit: MACPDU, Downlink-Shared Channel: DL-SCH, Physical Downlink Shared Channel: PDSCH).

HARQ-ACK may also be referred to as ACK/NACK, HARQ feedback, HARQ-ACK feedback, HARQ response, HARQ-ACK response, HARQ information, HARQ-ACK information, HARQ control information, and HARQ-ACK control information.

When the downlink data is successfully decrypted, an ACK for the downlink data is generated. When the downlink data is not successfully decrypted, a NACK is generated for the downlink data. The HARQ-ACK may at least include a HARQ-ACK bit corresponding to at least one transport block. The HARQ-ACK bit may indicate ACK (ACKnowledgement) or NACK (Negative-ACKnowledgement) corresponding to one or more transport blocks. The HARQ-ACK may at least include a HARQ-ACK codebook including one or more HARQ-ACK bits. The HARQ-ACK bit corresponding to one or more transport blocks may also be that the HARQ-ACK bit corresponds to a PDSCH including the one or more transport blocks.

The HARQ control for one transport block may be referred to as a HARQ process. One HARQ process identifier may be obtained for each HARQ process.

The terminal device 1 may, in the slot indicated by the value of the HARQ indicator field included in the DCI format 1_0 or the DCI format 1_1 corresponding to the reception PDSCH, use the HARQ-ACK codebook and report to the base station device 3.

For DCI format 10, the value of the HARQ indicator field may be mapped to a set of slots (1, 2, 3, 4, 5, 6, 7, 8). For DCI format 1_1, the value of the HARQ indicator field may be mapped to the set of slots given by the higher layer parameter dl-DataToUL-ACK. The number of slots indicated at least based on the value of the HARQ indicator field may also be referred to as HARQ-ACK timing or K1. For example, HARQ-ACK indicating the decoding state of PDSCH (downlink data) transmitted in slot n may be reported (transmitted) in slot n+K1.

dl-DataToUL-ACK indicates a list of HARQ-ACK timings for PDSCH. Timing is the number of slots between the slot where the PDSCH was received (or the slot including the last OFDM symbol to which the PDSCH is mapped) and the slot where the HARQ-ACK is transmitted for the reception PDSCH. For example, dl-DataToUL-ACK is a list of 1, 2, 3, 4, 5, 6, 7, or 8 timing(s). When dl-DataToUL-ACK is a list of 1 timing, the HARQ indicator field is 0 bits. When dl-DataToUL-ACK is a list of 2 timings, the HARQ indicator field is 1 bit. When dl-DataToUL-ACK is a list of 3 or 4 timings, the HARQ indicator field is 2 bits. When the dl-DataToUL-ACK is a list of 5, 6, 7, or 8 timings, the HARQ indicator field is 3 bits. For example, the dl-DataToUL-ACK is constructed of a list of timings with any value in the range 0 to 31. For example, the dl-DataToUL-ACK is constructed of a list of timings with any value in the range 0 to 63.

The size of dl-DataToUL-ACK is defined as the number of elements included in the dl-DataToUL-ACK. The size of dl-DataToUL-ACK may be referred to as $L_{para}$. The index of dl-DataToUL-ACK indicates the order (numbering) of the elements of dl-DataToUL-ACK. For example, when the size of the dl-DataToUL-ACK is 8 ($L_{para}$=8), the index of the dl-DataToUL-ACK is any value of 1, 2, 3, 4, 5, 6, 7, or 8. The index of dl-DataToUL-ACK may be obtained, represented, or indicated by the value indicated by the HARQ indicator field.

The terminal device 1 sets the size of the HARQ-ACK codebook according to the size of the dl-DataToUL-ACK. For example, when dl-DataToUL-ACK is configured of 8 elements, the size of HARQ-ACK codebook is 8. For example, when dl-DataToUL-ACK is configured of 2 elements, the size of HARQ-ACK codebook is 2. Each HARQ-ACK information configured in the HARQ-ACK codebook is the HARQ-ACK information received for PDSCH at each slot timing of dl-DataToUL-ACK. This type of HARQ-ACK codebook is also referred to as a Semi-static HARQ-ACK codebook.

An example of setting the HARQ indicator field will be described. For example, the dl-DataToUL-ACK is composed of a list of 8 timings 0, 7, 15, 23, 31, 39, 47, 55, and the HARQ indicator field is composed of 3 bits. The HARQ indicator field "000" corresponds to the timing of the first 0 in the list of dl-DataToUL-ACK. That is, the HARQ indicator field "000" corresponds to the value 0 indicated by the index 1 of the dl-DataToUL-ACK. The HARQ indicator field "001" corresponds to the timing of the second (7) in the list of dl-DataToUL-ACK. The HARQ indicator field "010" corresponds to the timing of the third (15) in the list of dl-DataToUL-ACK. The HARQ indicator field "011" corresponds to the timing of the fourth (23) in the list of dl-DataToUL-ACK. The HARQ indicator field "100" corresponds to the timing of the fifth (31) in the list of dl-DataToUL-ACK. The HARQ indicator field "101" corresponds to the timing of the sixth (39) in the list of dl-DataToUL-ACK. The HARQ indicator field "110" corresponds to the timing of the seventh (47) in the list of dl-DataToUL-ACK. The HARQ indicator field "111" corresponds to the timing of the eighth (55) in the list of dl-DataToUL-ACK. When the received HARQ indicator field indicates "000," the terminal device 1 transmits the corresponding HARQ-ACK in the $0^{th}$ Slot from the reception PDSCH slot. When the received HARQ indicator field indicates "001," the terminal device 1 transmits the corresponding HARQ-ACK in the $7^{th}$ slot from the reception PDSCH slot. When the received HARQ indicator field indicates "010," the terminal device 1 transmits the corresponding HARQ-ACK in the $15^{th}$ slot from the reception PDSCH slot. When the received HARQ indicator field indicates "011," the terminal device 1 transmits the corresponding HARQ-ACK in the $23^{rd}$ slot from the reception PDSCH slot. When the received HARQ indicator field indicates "100," the terminal device 1 transmits the corresponding HARQ-ACK in the $31^{st}$ slot from the reception PDSCH slot. When the received HARQ indicator field indicates "101," the terminal device 1 transmits the corresponding HARQ-ACK in the $39^{th}$ Slot from the reception PDSCH slot. When the received HARQ indicator field indicates "110," the terminal device 1 transmits the corresponding HARQ-ACK in the $47^{th}$ slot from the reception PDSCH slot. When the received HARQ indicator field indicates "111," the terminal device 1 transmits the corresponding HARQ-ACK in the $55^{th}$ slot from the reception PDSCH slot.

When the higher layer parameter pdsch-AggregationFactor is given to the terminal device 1, the $N_{PDSCH}^{repeat}$ may be the value of the pdsch-AggregationFactor. When the higher layer parameter pdsch-AggregationFactor is not given to the terminal device 1, the $N_{PDSCH}^{repeat}$ may be 1. The terminal device 1 may report HARQ-ACK information for the reception PDSCH from slot $n-N_{PDSCH}^{repeat}+1$ to slot n using PUCCH transmission and/or PUSCH transmission in slot n+k. Here, k may be the number of slots indicated by the HARQ indicator field included in the DCI format corresponding to the reception PDSCH. Furthermore, if the HARQ indicator field is not included in the DCI format, k may be given by the higher layer parameter dl-DataToUL-ACK.

If the terminal device 1 is configured to monitor the PDCCH including the DCI format 1_0 and is configured not to monitor the PDCCH containing the DCI format 11, the HARQ-ACK timing value K1 may also be a part or all of (1, 2, 3, 4, 5, 6, 7, 8). If the terminal device 1 is configured to monitor PDCCH including the DCI format 1_1, the HARQ-ACK timing value K1 may be given by the higher layer parameter dl-DataToUL-ACK.

The terminal device 1 determines a set of a plurality of opportunities for one or more candidate reception PDSCHs to transmit the corresponding HARQ-ACK information on the PUCCH of a certain slot. The terminal device 1 determines that the plurality of slots of the slot timing K1 included in the dl-DataToUL-ACK as a plurality of opportunities for the candidate reception PDSCH. K1 may be a set of k. For example, when dl-DataToUL-ACK is (1, 2, 3, 4, 5, 6, 7, 8), in slot n, the PUCCH transmits the reception PDSCH in slot n−1, the reception PDSCH in slot n−2, the reception PDSCH in slot n−3, the reception PDSCH in slot n−4, the reception PDSCH in slot n−5, the reception PDSCH in slot n−6, the reception PDSCH in slot n−7, the HARQ-ACK information of the reception PDSCH in slot n−8. When the terminal device 1 actually receives the PDSCH in the slot corresponding to the candidate reception PDSCH, the terminal device 1 sets ACK or NACK as HARQ-ACK information based on the transport block included in the PDSCH, and when the terminal device 1 does not receive the PDSCH in the slot corresponding to the candidate reception PDSCH, NACK is set as HARQ-ACK information.

The HARQ indicator field included in the DCI format received on the PDCCH of the slot n−1 indicates 1. The HARQ indicator field included in the DCI format received on the PDCCH of the n−2 slot indicates 2. The HARQ indicator field included in the DCI format received on the PDCCH of the n−3 slot indicates 3. The HARQ indicator field included in the DCI format received on the PDCCH of the n−4 slot indicates 4. The HARQ indicator field included in the DCI format received on the PDCCH of the n−5 slot indicates 5. The HARQ indicator field included in the DCI format received on the PDCCH of the slot n−6 indicates 6. The HARQ indicator field included in the DCI format received on the PDCCH of the slot n−7 indicates 7. The HARQ indicator field included in the DCI format received on the PDCCH of the n−8 slot indicates 8.

The terminal device 1, based on a slot of reception of PDCCH and the value of the HARQ indicator field included in the received DCI format, determines the set of slots, a slot for transmitting HARQ-ACK information and a plurality of candidate PDSCHs corresponding to the HARQ-ACK information. For example, when dl-DataToUL-ACK is (1, 2, 3, 4, 5, 6, 7, 8), the terminal device 1 receives the PDCCH in the slot m, and the HARQ indicator field included in the DCI format is 4. The terminal device 1 determines that the HARQ-ACK information is transmitted in the slot (m+4). The terminal device 1 determines that other HARQ-ACK information transmitted in the slot (m+4) is the HARQ-ACK information for reception PDSCH in the slot (m+(1−4)), the HARQ-ACK information for reception PDSCH in the slot (m+(2−4)), the HARQ-ACK information for reception PDSCH in slot (m+(3−4)), the HARQ-ACK information for reception PDSCH in slot (m+(5−4)), the HARQ-ACK information for reception PDSCH reception in slot (m+(6−4)), the HARQ-ACK information for reception PDSCH in slot (m+(7−4)), and the HARQ-ACK information for reception PDSCH in slot (m+(8−4)).

The dl-DataToUL-ACK can be configured not only as a value indicating the number of slots as the timing of HARQ-ACK, but also as a value (information) indicating the holding HARQ-ACK. When the terminal device 1 receives a HARQ indicator field indicating a value of the HARQ-ACK held on the PDCCH, the terminal device 1 holds the HARQ-ACK (HARQ-ACK information) for the PDSCH scheduled on the PDCCH, and waits the transmission of the HARQ-ACK (HARQ-ACK information).

The DCI format including the HARQ indicator field is a DL assignment (Downlink assignment). DL assignment is a DCI format used for PDSCH scheduling. DL assignment is a DCI format used for PDSCH allocation. A certain HARQ-ACK codebook (the first HARQ-ACK codebook) is instructed (triggered, requested) to be transmitted by the DCI format of DL assignment. The first HARQ-ACK codebook is configured based on the dl-DataToUL-ACK and the HARQ indicator field. The size of the first HARQ-ACK codebook is based on the size included in the dl-DataToUL-ACK. The timing of the slot included in the first HARQ-ACK codebook is based on the value of the HARQ indicator field and the slot in which the DCI including the HARQ indicator field is received.

A certain HARQ-ACK codebook (the second HARQ-ACK codebook) is instructed (triggered, requested) to be transmitted by a DCI format that is not a DL assignment. For example, a DCI format that is not a DL assignment is a DCI format that is used only to trigger the transmission of a second HARQ-ACK codebook. For example, the DCI format that is not a DL assignment is a DCI format (UL assignment) that schedules PUSCH.

The second HARQ-ACK codebook includes HARQ-ACK information for a plurality of or all HARQ processes. For example, a HARQ process may mean a HARQ process used for PDSCH. For example, all HARQ processes may mean all of the HARQ processes that can be used in at least one serving cell. For example, the number of HARQ processes that can be used in one serving cell is 16. For example, the number of HARQ processes that can be used in 5 serving cells is 80. For example, a plurality of HARQ processes may mean a plurality of HARQ processes configured by RRC signaling. For example, the plurality of HARQ processes may mean a plurality of HARQ processes instructed by the downlink control information. For example, a plurality of HARQ processes may mean a plurality of HARQ processes that are explicitly or implicitly instructed. For example, the number of a plurality of HARQ processes is 8. For example, the number of a plurality of HARQ processes is 10.

When the terminal device 1 triggers the transmission of the first HARQ-ACK codebook and the transmission of the second HARQ-ACK codebook is triggered before transmitting the first HARQ-ACK codebook, the terminal device 1 cancels (does not perform) the transmission of the first HARQ-ACK codebook and transmits the second HARQ-ACK codebook. When the terminal device 1 is triggered to transmit the first HARQ-ACK codebook, and before transmitting the first HARQ-ACK codebook, the transmission of the second HARQ-ACK codebook is triggered, and one or more HARQ processes (a first HARQ process set) corresponding to the HARQ-ACK included in the codebook corresponds to one or more HARQ processes (a second HARQ process set) corresponding to the HARQ-ACK included in the second HARQ-ACK codebook, the terminal device 1 cancels (does not perform) the transmission of the first HARQ-ACK codebook and transmits the second HARQ-ACK codebook. When the terminal device 1 is triggered to transmit the first HARQ-ACK codebook, and before transmitting the first HARQ-ACK codebook, the transmission of the second HARQ-ACK codebook is triggered, and one or more HARQ processes (the first HARQ process set) corresponding to the HARQ-ACK not included in the codebook corresponds to one or more HARQ processes (the second HARQ process set) corresponding to the HARQ-ACK included in the second HARQ-ACK codebook, the terminal device 1 does not cancel (performs) the transmission of the first HARQ-ACK codebook and transmission of the second HARQ-ACK codebook. When a part of the first HARQ process set is not included in the second HARQ-ACK process set, the terminal device 1 does not cancel the transmission of the first HARQ-ACK codebook and performs the transmission of the first HARQ-ACK codebook and the second HARQ-ACK codebook.

An example of transmission of the HARQ-ACK codebook according to the implementation of the present disclosure will be described. The terminal device 1 receives the DCI format in the slot (n) which indicates the scheduling of the PDSCH of HARQ process #5. The DCI format includes a HARQ indicator field indicating "30," and the terminal device 1 recognizes that the transmission of the first HARQ-ACK codebook is triggered in the slot (n+30). The terminal device 1 recognizes that the HARQ-ACK of the transport block received on the PDSCH of the HARQ process #5 transmitted in the slot (n+30) using the first HARQ-ACK codebook. The terminal device 1 receives the DCI format that triggers the transmission of the second HARQ-ACK codebook in the slot (n+20). The terminal device 1 cancels the transmission of the first HARQ-ACK codebook in the slot (n+30), and transmits HARQ-ACK for the transport block received on the PDSCH of HARQ process #5 in the second HARQ-ACK codebook.

An example of transmission of the HARQ-ACK codebook according to the implementation of the present disclosure will be described. The terminal device 1 uses RRC signaling to configure the 8 HARQ processes of HARQ processes #1, #2, #3, #4, #5, #6, #7, and #8 for the second HARQ-ACK codebook. The terminal device 1 recognizes the transmission of the HARQ-ACK for the transport block received on the PDSCH of HARQ processes #1, #2, #3, #4, #5, #6, #7, and #8 using the second HARQ-ACK codebook. The terminal device 1 is configured with a list of 8 timings of 5, 10, 15, 20, 23, 25, 30, and 35 as dl-DataToUL-ACK for the first HARQ-ACK codebook.

The terminal device 1 receives the DCI format in the slot (n) which indicates the scheduling of the PDSCH of HARQ process #7. The DCI format includes a HARQ indicator field indicating "35," and the terminal device 1 recognizes that the transmission of the first HARQ-ACK codebook is triggered in the slot (n+35). The terminal device 1 recognizes that the HARQ-ACK of the transport block received on the PDSCH of the HARQ process #7 transmitted in the slot (n+35) using the first HARQ-ACK codebook. The terminal device 1 recognizes the transmission of the HARQ-ACK for the transport block received on the PDSCH in a slot (n), a slot (n+(35−30)), a slot (n+(35−25)), a slot (n+(35−23)), a slot (n+(35−20)), a slot (n+(35−15)), a slot (n+(35−10)), a slot (n+(35−5)) using the first HARQ-ACK codebook. Furthermore, when the terminal device 1 does not actually receive the PDSCH in the corresponding slot, the terminal device 1 sets NACK in HARQ-ACK and recognizes that no HARQ process is used for the corresponding slot.

The terminal device 1 receives the DCI format that triggers the transmission of the second HARQ-ACK codebook in the slot (n+25). The terminal device 1 determines that the HARQ process #7 included in the first HARQ process set is included in the second HARQ process set, and cancels the transmission of the first HARQ-ACK codebook in the slot (n+35), and the second HARQ-ACK codebook transmits HARQ-ACK for the transport block received on the PDSCH of HARQ process #7.

An example of transmission of the HARQ-ACK codebook according to the implementation of the present disclosure will be described. The terminal device 1 uses RRC signaling to configure the 8 HARQ processes of HARQ processes #1, #2, #3, #4, #5, #6, #7, and #8 for the second HARQ-ACK codebook. The terminal device 1 recognizes the transmission of the HARQ-ACK for the transport block received on the PDSCH of HARQ processes #1, #2, #3, #4, #5, #6, #7, and #8 using the second HARQ-ACK codebook. The terminal device 1 is configured with a list of 8 timings of 5, 10, 15, 20, 23, 25, 30, and 35 as dl-DataToUL-ACK for the first HARQ-ACK codebook.

The terminal device 1 receives the DCI format in the slot (n) which indicates the scheduling of the PDSCH of HARQ process #7. The DCI format includes a HARQ indicator field indicating "35," and the terminal device 1 recognizes that the transmission of the first HARQ-ACK codebook is triggered in the slot (n+35). The terminal device 1 recognizes that the HARQ-ACK of the transport block received on the PDSCH of the HARQ process #7 transmitted in the slot (n+35) using the first HARQ-ACK codebook. The terminal device 1 receives the DCI format in the slot (n+5) which indicates the scheduling of the PDSCH of HARQ process #10. The DCI format includes a HARQ indicator field indicating "30." The terminal device 1 recognizes that the HARQ-ACK of the transport block received on the PDSCH of the HARQ process #10 transmitted in the slot (n+35) using the first HARQ-ACK codebook. The terminal device 1 uses the HARQ-ACK for the transport block received on the PDSCH of HARQ process #7 in the slot (n+35) to recognize the transmission of the HARQ-ACK for the transport block received on the PDSCH of HARQ process #10 using the first HARQ-ACK codebook. The terminal device 1 recognizes the transmission of the HARQ-ACK for the transport block received on the PDSCH in a slot (n), a slot (n+(35−30)), a slot (n+(35−25)), a slot (n+(35−23)), a slot (n+(35−20)), a slot (n+(35−15)), a slot (n+(35−10)), a slot (n+(35−5)) using the first HARQ-ACK codebook. Furthermore, when the terminal device 1 does not actually receive the PDSCH in the corresponding slot, the terminal device 1 sets NACK in HARQ-ACK and recognizes that no HARQ process is used for the corresponding slot.

The terminal device 1 receives the DCI format that triggers the transmission of the second HARQ-ACK codebook in the slot (n+25). The terminal device 1 determines that the HARQ process #10 included in the first HARQ process set is included in the second HARQ process set, and determines to perform the transmission of the first HARQ-ACK codebook in the slot (n+35). The terminal device 1 uses the first HARQ-ACK codebook and the second HARQ-ACK codebook to transmit HARQ-ACK for the transport block received on the PDSCH of HARQ process #7.

The first HARQ-ACK codebook may be said to be a HARQ-ACK codebook whose transmission is triggered by a DCI format (DL assignment) accompanied by PDSCH scheduling information. The second HARQ-ACK codebook may be said to be a HARQ-ACK codebook whose transmission is triggered by a DCI format different from the DCI format accompanied by PDSCH scheduling information (the DCI format only for instructing the transmission of the HARQ-ACK codebook, the DCI format accompanied by PUSCH scheduling information).

The first HARQ-ACK codebook may be said to be a HARQ-ACK codebook that defines the relationship between the slot in which the HARQ-ACK codebook is transmitted and received and the PDSCH slot corresponding to the HARQ-ACK included in the HARQ-ACK codebook. The HARQ process used for the PDSCH corresponding to the HARQ-ACK included in the first HARQ-ACK codebook is not limited in advance, and is set by the scheduling of the base station device 3. The second HARQ-ACK codebook may be said to be a HARQ-ACK codebook that defines the HARQ process of the PDSCH corresponding to the HARQ-ACK included in the HARQ-ACK codebook. The slot in which the PDSCH corresponding to the HARQ-ACK included in the second HARQ-ACK codebook is received is not limited in advance, and is set by the scheduling of the base station device 3.

Figure 6:
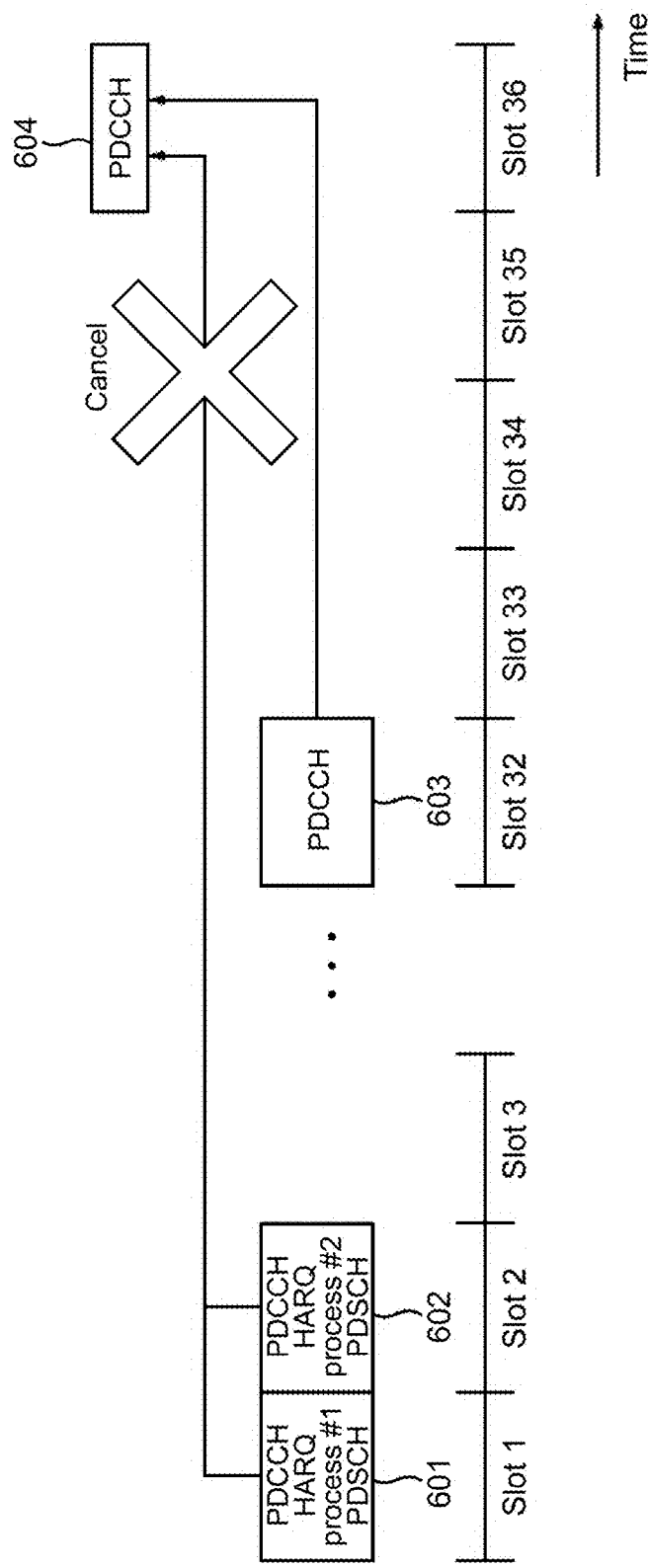
FIG. 6 is a schematic diagram illustrating transmission of a HARQ-ACK codebook according to the present disclosure.

FIG. 6 is schematic diagram illustrating transmission of a HARQ-ACK codebook according to an aspect of the present disclosure. The terminal device 1 is configured with a list of 5 timings of 31, 32, 33, 34, and 35 as dl-DataToUL-ACK for the first HARQ-ACK codebook. The terminal device 1 is configured with the 8 HARQ processes, HARQ process #1, #2, #3, #4, #5, #6, #7, and #8 for the second HARQ-ACK codebook.

The terminal device 1 receives the DL assignment in slot 1 (601). The DL assignment indicates HARQ process #1 as the number of HARQ process used for PDSCH. The DL assignment indicates 35 as a HARQ indicator field. The terminal device 1 sets the HARQ-ACK for the transport block of the PDSCH of HARQ process #1 received in slot 1 as the first HARQ-ACK codebook, and recognizes the transmission in slot 36 after slots 1 to 35.

The terminal device 1 receives the DL assignment in slot 2 (602). The DL assignment indicates HARQ process #2 as the number of HARQ process used for PDSCH. The DL assignment indicates 34 as a HARQ indicator field. The terminal device 1 sets the HARQ-ACK for the transport block of the PDSCH of HARQ process #2 received in slot 2 as the first HARQ-ACK codebook, and recognizes the transmission in slot 36 after slots 2 to 34.

The terminal device 1 receives the DCI format that triggers the transmission of the second HARQ-ACK codebook in the slot 32 (603). The terminal device 1 recognizes the cancellation of the transmission of the first HARQ-ACK codebook, and transmits the second HARQ-ACK codebook in slot 36. The terminal device 1 transmits a second HARQ-ACK codebook in slot 36, the second HARQ-ACK includes at least transport block for the PDSCH of HARQ process #1 and transport block for the PDSCH of HARQ process #2 (604).

Since the transmission of the first HARQ-ACK codebook is triggered by the DL assignment including the HARQ indicator field, the base station device 3 must, at the timing of scheduling the PDSCH, decide to cause the terminal device 1 to transmit the first HARQ-ACK codebook later. The longer the slot timing that can be indicated in the HARQ indicator field, the more the base station device 3 must make a decision to have the terminal device 1 transmit the first HARQ-ACK codebook later. In one aspect of the present disclosure, when the base station device 3 preferably changes the PDSCH scheduling and the HARQ-ACK transmission/reception, the first HARQ-ACK codebook transmission is canceled, and instead, the second HARQ-ACK codebook is used in transmitting/receiving of HARQ-ACK. The base station device 3 may perform efficient scheduling, and as a result, the terminal device 1 may perform communication efficiently.

Hereinafter, aspects of various devices according to one aspect of the present disclosure will be described.

(1) In order to achieve the above, the present disclosure implements the following method. That is, the first aspect of the present disclosure is a terminal device comprising a processor and a memory for storing a computer program, wherein, when the processor executes the computer program, causes the terminal device to perform operations comprising: triggering transmission of a first hybrid automatic repeat request acknowledgement (HARQ-ACK) codebook; when transmission of a second HARQ-ACK codebook is triggered before the first HARQ-ACK codebook has been transmitted, canceling the transmission of the first HARQ-ACK codebook; and transmitting the second HARQ-ACK codebook.

(2) Furthermore, the first HARQ-ACK codebook defines a relationship between a slot in which the first HARQ-ACK codebook is transmitted/received and a physical downlink shared channel (PDSCH) slot corresponding to a HARQ-ACK among at least one HARQ-ACK included in the first HARQ-ACK codebook; and the second HARQ-ACK codebook defines a HARQ process of a PDSCH corresponding to a HARQ-ACK among at least one HARQ-ACK included in the second HARQ-ACK codebook.

(3) Furthermore, the operations further comprise: when a first HARQ process set comprising one or more HARQ processes corresponding to the at least one HARQ-ACK included in the first HARQ-ACK codebook is included in a second HARQ process set comprising one or more HARQ processes corresponding to the at least one HARQ-ACK included in the second HARQ-ACK codebook, canceling the transmission of the first HARQ-ACK codebook.

(4) Furthermore, the operations further comprise: when the first HARQ process set is not included in the second HARQ process set, not canceling the transmission of the first HARQ-ACK codebook.

(5) A second aspect of the present disclosure is a communication method used for a terminal device, the communication method comprising: triggering transmission of a first hybrid automatic repeat request acknowledgement (HARQ-ACK) codebook; when transmission of a second HARQ-ACK codebook is triggered before the first HARQ-ACK codebook has been transmitted, canceling the transmission of the first HARQ-ACK codebook; and transmitting the second HARQ-ACK codebook.

(6) Furthermore, the first HARQ-ACK codebook defines a relationship between a slot in which the first HARQ-ACK codebook is transmitted/received and a physical downlink shared channel (PDSCH) slot corresponding to a HARQ-ACK among at least one HARQ-ACK included in the HARQ-ACK codebook; and the second HARQ-ACK codebook defines a HARQ process of a PDSCH corresponding to a HARQ-ACK among at least one HARQ-ACK included in the second HARQ-ACK codebook.

(7) Furthermore, the communication method further comprises: when a first HARQ process set comprising one or more HARQ processes corresponding to the at least one HARQ-ACK included in the first HARQ-ACK codebook is included in a second HARQ process set comprising one or more HARQ processes corresponding to the at least one HARQ-ACK included in the second HARQ-ACK codebook, canceling the transmission of the first HARQ-ACK codebook.

(8) Furthermore, the communication method further comprises: when the first HARQ process set is not included in the second HARQ process set, not canceling the transmission of the first HARQ-ACK codebook.

The program operating on the base station device 3 and the terminal device 1 according to the present disclosure controls programs like a CPU (Central Processing Unit) or the like to realize the functions of the above implementations according to the present disclosure (programs that causes the computer to function). Furthermore, the information processed by the devices is temporarily stored in a RAM (Random Access Memory) at the time of processing, and thereafter stored in various ROM (Read Only Memory), such as a Flash ROM, or an HDD (Hard Disk Drive), which may be read, corrected and written by the CPU as necessary.

Furthermore, a part of the terminal device 1 or the base station device 3 in the above implementations may be realized by a computer. In this situation, a program for realizing the control functions may be recorded on a computer-readable recording medium, and the program recorded on the recording medium may be read by a computer system and executed for realizing the functions.

Furthermore, the "computer system" herein is a computer system built in the terminal device 1 or the base station device 3 and includes an OS and hardware such as peripheral devices. The "computer-readable recording medium" refers to a portable medium such as a flexible disk, an optical disk, a ROM, and a CD-ROM, and a storage device such as a hard disk built in a computer system.

Furthermore, the "computer-readable recording medium" may include a medium that dynamically stores the program for a short time, such as a communication line for transmitting the program through a network, like the Internet or a communication line such as a telephone line, a server in this situation, a medium storing a program for a certain period of time, such as a volatile memory in a computer system at a client end. Furthermore, the above-mentioned program may be a program for realizing a part of the functions described above, and may be a program capable of realizing the functions described above in combination with a program already recorded in a computer system.

The terminal device 1 may be configured of at least one processor and at least one memory including computer program instructions (computer program). The memory and the computer program instructions (computer program) may be configured such that the terminal device 1 performs the operations and processes described in the above-described implementations by using a processor. The base station device 3 may be configured of at least one processor and at least one memory including computer program instructions (computer programs). The memory and the computer program instructions (computer program) may be configured such that the base station device 3 performs the operations and processes described in the above-described implementations by using a processor.

The base station device 3 in the above implementations can also be realized as a set of a plurality of devices (device group). Each of the devices included in the device group may include a part or all of each function or each functional block of the base station device 3 according to the above implementations. The device group may just need to have each function or each function block of the base station device 3. Furthermore, the terminal device 1 according to the above implementations can also communicate with the base station device as a set.

Furthermore, the base station device 3 in the above implementations may be a EUTRAN (Evolved Universal Terrestrial Radio Access Network) and/or an NG-RAN (NextGen RAN, NR RAN). Furthermore, the base station device 3 in the above implementations may have some or all of the functions of the higher node for the eNodeB and/or gNB.

Furthermore, a part or all of the terminal device 1 and the base station device 3 in the above-described implementations may be typically realized as an LSI of an integrated circuit, or as a chipset. Each functional block of the terminal device 1 and the base station device 3 may be individually formed into a single chip, or a part or all may be integrated and formed into a chip. Furthermore, the method of circuit integration is not limited to LSI, and may be realized by a dedicated circuit or a general-purpose processor. Furthermore, in the case when a technology for forming an integrated circuit that replaces the LSI appears from the advancing of the semiconductor technology, an integrated circuit based on the technology may also be used.

Furthermore, in the above implementations, the terminal device is described as an example of the communications device. The present disclosure is not limited to the disclosed implementations, and may be applied to fixed or non-mobile electronic equipment installed indoor or outdoor. For example, the electronic equipment may be Audio-Video equipment, kitchen equipment, cleaning equipment, air-conditioner, office equipment, vending machines, other home appliances, terminal devices or communications devices.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A terminal device comprising:
   at least one processor; and
   at least one non-transitory computer-readable medium storing one or more computer-executable instructions that, when executed by the at least one processor, cause the terminal device to:
   trigger a transmission of a first hybrid automatic repeat request acknowledgement (HARQ-ACK) codebook; and
   when a transmission of a second HARQ-ACK codebook is triggered before the first HARQ-ACK codebook has been transmitted:
      cancel the transmission of the first HARQ-ACK codebook, and
      transmit the second HARQ-ACK codebook, wherein:
   the first HARQ-ACK codebook defines a relationship between a slot in which the first HARQ-ACK codebook is transmitted/received and a physical downlink shared channel (PDSCH) slot corresponding to a HARQ-ACK among at least one HARQ-ACK included in the first HARQ-ACK codebook, and
   the second HARQ-ACK codebook defines a HARQ process of a PDSCH corresponding to a HARQ-ACK among at least one HARQ-ACK included in the second HARQ-ACK codebook.

2. The terminal device according to claim 1, wherein the one or more computer-executable instructions, when executed by the at least one processor, further cause the terminal device to:
   when a first HARQ process set comprising one or more HARQ processes corresponding to the at least one HARQ-ACK included in the first HARQ-ACK codebook is included in a second HARQ process set comprising one or more HARQ processes corresponding to the at least one HARQ-ACK included in the second HARQ-ACK codebook, cancel the transmission of the first HARQ-ACK codebook.

3. The terminal device according to claim 2, wherein the one or more computer-executable instructions, when executed by the at least one processor, further cause the terminal device to:
   when the first HARQ process set is not included in the second HARQ process set, forgo canceling the transmission of the first HARQ-ACK codebook.

4. A communication method used for a terminal device, the communication method comprising:
   triggering a transmission of a first hybrid automatic repeat request acknowledgement (HARQ-ACK) codebook; and
   when a transmission of a second HARQ-ACK codebook is triggered before the first HARQ-ACK codebook has been transmitted:
      canceling the transmission of the first HARQ-ACK codebook, and
      transmitting the second HARQ-ACK codebook, wherein:
   the first HARQ-ACK codebook defines a relationship between a slot in which the first HARQ-ACK codebook is transmitted/received and a physical downlink shared channel (PDSCH) slot corresponding to a HARQ-ACK among at least one HARQ-ACK included in the first HARQ-ACK codebook, and
   the second HARQ-ACK codebook defines a HARQ process of a PDSCH corresponding to a HARQ-ACK among at least one HARQ-ACK included in the second HARQ-ACK codebook.

5. The communication method according to claim 4, further comprising:
   when a first HARQ process set comprising one or more HARQ processes corresponding to the at least one HARQ-ACK included in the first HARQ-ACK codebook is included in a second HARQ process set comprising one or more HARQ processes corresponding to the at least one HARQ-ACK included in the second HARQ-ACK codebook, canceling the transmission of the first HARQ-ACK codebook.

6. The communication method according to claim 5, further comprising:
   when the first HARQ process set is not included in the second HARQ process set, forgoing canceling the transmission of the first HARQ-ACK codebook.

* * * * *